US011418465B2

(12) United States Patent
Taitz et al.

(10) Patent No.: US 11,418,465 B2
(45) Date of Patent: *Aug. 16, 2022

(54) EVENT PLANNING IN A CONTENT SHARING PLATFORM

(71) Applicant: Snap Inc., Santa Monica, CA (US)

(72) Inventors: David Taitz, Santa Monica, CA (US); Celia Nicole Mourkogiannis, Los Angeles, CA (US); David Zak Lipowicz, New York, NY (US); Nathaniel Parrott, Brooklyn, NY (US); Nayana Samaranayake, New York, NY (US); Ty Giacalone, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/222,247

(22) Filed: Apr. 5, 2021

(65) Prior Publication Data
US 2021/0226904 A1    Jul. 22, 2021

Related U.S. Application Data

(63) Continuation of application No. 16/503,783, filed on Jul. 5, 2019, now Pat. No. 11,134,036.

(51) Int. Cl.
*G06F 15/16* (2006.01)
*H04L 51/04* (2022.01)
(Continued)

(52) U.S. Cl.
CPC ............ *H04L 51/04* (2013.01); *G06F 3/1454* (2013.01); *G06T 11/60* (2013.01); *H04L 51/10* (2013.01);
(Continued)

(58) Field of Classification Search
CPC ......... H04L 51/04; H04L 51/10; H04L 51/32; H04L 65/4015; G06F 3/1454; G06T 11/60
(Continued)

(56) References Cited

U.S. PATENT DOCUMENTS 6,681,393 B1 * 1/2004 Bauminger ...... H04N 21/44222
348/E7.071
6,732,103 B1   5/2004 Strick et al.
(Continued)

FOREIGN PATENT DOCUMENTS

WO     2017106529      6/2017
WO     WO-2021216999 A1   10/2021

OTHER PUBLICATIONS

"U.S. Appl. No. 16/503,783, Notice of Allowance dated May 27, 2021", 5 pgs.
(Continued)

*Primary Examiner* — Anthony Mejia
(74) *Attorney, Agent, or Firm* — Schwegman Lundberg & Woessner, P.A.

(57) ABSTRACT

Systems and methods are provided for receiving a selection to add an event invite media overlay to a media content item, receiving content to be added to the event invite media overlay, the content corresponding to an event, and adding to the event invite media overlay, the content corresponding to the event to generate a custom event invite media overlay. The systems and methods further comprise causing display of the custom event invite media overlay on the media content item, receiving at least one user to which to send an invite to the event, and sending, to a second computing device associated with the at least one user, an invite to the event, the invite comprising the custom event invite media overlay and the media content item.

20 Claims, 23 Drawing Sheets

(51) Int. Cl.
  *H04L 51/10* (2022.01)
  *H04L 65/401* (2022.01)
  *G06F 3/14* (2006.01)
  *G06T 11/60* (2006.01)
  *H04L 51/52* (2022.01)

(52) U.S. Cl.
  CPC .......... *H04L 51/32* (2013.01); *H04L 65/4015* (2013.01); *G06T 2200/24* (2013.01)

(58) Field of Classification Search
  USPC ...................................................... 709/206
  See application file for complete search history.

(56) References Cited

U.S. PATENT DOCUMENTS

| | | | |
|---|---|---|---|
| 7,397,806 | B2 | 7/2008 | Burger |
| 7,818,415 | B2* | 10/2010 | Jhanji ................ G06Q 30/0259 709/207 |
| 8,065,171 | B2 | 11/2011 | Nguyen et al. |
| 8,643,677 | B2 | 2/2014 | Suzuki |
| RE45,040 | E | 7/2014 | Fish et al. |
| 8,933,967 | B2* | 1/2015 | Huston ................ H04W 4/029 345/635 |
| 9,118,723 | B1* | 8/2015 | Su ............................ G06F 15/00 |
| 9,245,025 | B2 | 1/2016 | Chen |
| 9,356,904 | B1 | 5/2016 | Ho |
| 9,495,086 | B2 | 11/2016 | May et al. |
| 9,544,257 | B2 | 1/2017 | Ogundokun et al. |
| 9,639,561 | B2* | 5/2017 | Roberts ................ G06F 16/21 |
| 9,817,995 | B2 | 11/2017 | Papakipos et al. |
| 9,918,193 | B1* | 3/2018 | Nguyen ............ G06F 3/04883 |
| 9,992,146 | B2 | 6/2018 | Fabre et al. |
| 10,049,330 | B2 | 8/2018 | Alag et al. |
| 10,395,257 | B2 | 8/2019 | Patterson et al. |
| 10,559,107 | B1 | 2/2020 | Charlton et al. |
| 11,134,036 | B2 | 9/2021 | Taitz et al. |
| 2002/0070954 | A1 | 6/2002 | Lang |
| 2004/0162881 | A1 | 8/2004 | Digate et al. |
| 2005/0267975 | A1 | 12/2005 | Qureshi et al. |
| 2007/0198316 | A1 | 8/2007 | Boland et al. |
| 2007/0250366 | A1 | 10/2007 | Nurmi |
| 2008/0098079 | A1 | 4/2008 | Sanghavi |
| 2008/0162615 | A1 | 7/2008 | Hurmola et al. |
| 2009/0132665 | A1 | 5/2009 | Thomsen et al. |
| 2009/0228322 | A1 | 9/2009 | Van Os et al. |
| 2010/0131598 | A1 | 5/2010 | Ruelas-arana |
| 2011/0035678 | A1 | 2/2011 | Hamrick et al. |
| 2011/0066363 | A1 | 3/2011 | Kimishima |
| 2011/0126253 | A1* | 5/2011 | Roberts .............. H04N 21/6125 725/114 |
| 2011/0244894 | A1 | 10/2011 | Mahalingam |
| 2012/0102123 | A1 | 4/2012 | Tysk |
| 2012/0246679 | A1 | 9/2012 | Chen |
| 2012/0290666 | A1 | 11/2012 | Fabre et al. |
| 2012/0331568 | A1* | 12/2012 | Weinstein .............. H04L 12/185 726/29 |
| 2013/0066963 | A1* | 3/2013 | Odio ........................ H04L 51/32 709/204 |
| 2013/0144674 | A1* | 6/2013 | Kim .................... G06Q 30/0267 705/7.19 |
| 2013/0198013 | A1* | 8/2013 | Shehan ................. G06Q 30/02 705/14.73 |
| 2013/0212494 | A1* | 8/2013 | Heiferman .......... H04L 12/1818 715/753 |
| 2013/0329060 | A1* | 12/2013 | Yim ........................ G06F 16/50 348/207.1 |
| 2013/0332856 | A1* | 12/2013 | Sanders ................ G06F 3/0488 715/753 |
| 2014/0143434 | A1 | 5/2014 | Sanche |
| 2014/0172856 | A1 | 6/2014 | Imbruce et al. |
| 2014/0280566 | A1* | 9/2014 | Chen ........................ H04L 63/10 709/204 |
| 2014/0379798 | A1* | 12/2014 | Bunner ................ G06Q 50/01 709/204 |
| 2015/0066614 | A1 | 3/2015 | Gilmartin et al. |
| 2015/0170045 | A1* | 6/2015 | Kirkham ................ G06Q 10/06 706/11 |
| 2015/0222580 | A1* | 8/2015 | Grue .................... H04L 65/4015 709/206 |
| 2015/0269531 | A1 | 9/2015 | Menayas et al. |
| 2015/0271126 | A1 | 9/2015 | Menayas et al. |
| 2015/0271638 | A1 | 9/2015 | Menayas et al. |
| 2015/0324826 | A1* | 11/2015 | Mizushima ........ G06Q 30/0214 705/14.16 |
| 2016/0014059 | A1 | 1/2016 | Rathod |
| 2016/0191653 | A1* | 6/2016 | Aluotto .................. G06Q 50/01 709/205 |
| 2016/0253833 | A1* | 9/2016 | Lew .................... H04N 1/00196 715/202 |
| 2016/0261527 | A1 | 9/2016 | Huang |
| 2016/0269675 | A1* | 9/2016 | Tsujimoto ............ H04N 9/8233 |
| 2017/0024071 | A1* | 1/2017 | Hosier, Jr. ........... G06F 3/04817 |
| 2017/0124606 | A1 | 5/2017 | Belle |
| 2017/0149699 | A1* | 5/2017 | Hinson, Jr. .............. H04L 51/10 |
| 2017/0177607 | A1* | 6/2017 | Fahey .................... G06F 3/0482 |
| 2017/0221095 | A1* | 8/2017 | Gauglitz .............. G06Q 30/0252 |
| 2017/0279751 | A1* | 9/2017 | Quirarte ................ H04L 51/10 |
| 2017/0357950 | A1 | 12/2017 | Bennett et al. |
| 2018/0013861 | A1* | 1/2018 | Howard ................ G06F 16/951 |
| 2018/0191831 | A1* | 7/2018 | Wadley .................. G06V 40/10 |
| 2018/0227376 | A1 | 8/2018 | Schneider et al. |
| 2018/0241705 | A1 | 8/2018 | Sarafa et al. |
| 2018/0246623 | A1 | 8/2018 | Peled et al. |
| 2018/0246983 | A1 | 8/2018 | Rathod |
| 2018/0253901 | A1 | 9/2018 | Charlton et al. |
| 2018/0329622 | A1 | 11/2018 | Missig et al. |
| 2018/0336644 | A1 | 11/2018 | Albertine et al. |
| 2018/0350144 | A1 | 12/2018 | Rathod |
| 2018/0351888 | A1 | 12/2018 | Howard |
| 2018/0351895 | A1* | 12/2018 | Rathod ................ A63F 13/655 |
| 2018/0357609 | A1 | 12/2018 | Hwacinski et al. |
| 2019/0188752 | A1 | 6/2019 | Jones |
| 2019/0205841 | A1 | 7/2019 | Burlin et al. |
| 2019/0333023 | A1 | 10/2019 | Foran |
| 2019/0356620 | A1 | 11/2019 | Presley et al. |
| 2019/0392399 | A1 | 12/2019 | Horne |
| 2020/0112450 | A1 | 4/2020 | Chhabra et al. |
| 2020/0120170 | A1 | 4/2020 | Amitay et al. |
| 2020/0177965 | A1* | 6/2020 | Fawcett .......... H04N 21/25816 |
| 2020/0184478 | A1 | 6/2020 | Peled et al. |
| 2020/0193390 | A1 | 6/2020 | Almanza Ahumada et al. |
| 2020/0410453 | A1 | 12/2020 | Nalliah et al. |
| 2021/0006519 | A1 | 1/2021 | Taitz et al. |
| 2021/0306288 | A1 | 9/2021 | Boyd et al. |
| 2021/0336916 | A1 | 10/2021 | Boyd et al. |

OTHER PUBLICATIONS

"U.S. Appl. No. 16/856,811, Non Final Office Action dated Jun. 9, 2021", 20 pgs.

"International Application Serial No. PCT/US2021/028840, International Search Report dated Aug. 12, 2021", 3 pgs.

"International Application Serial No. PCT/US2021/028840, Written Opinion dated Aug. 12, 2021", 4 pgs.

"U.S. Appl. No. 16/503,783, Non Final Office dated Oct. 16, 2020", 16 pgs.

"U.S. Appl. No. 16/503,783, Notice of Allowance dated Jan. 11, 2021", 11 pgs.

"U.S. Appl. No. 16/503,783, Response filed Dec. 21, 2020 to Non Final Office Action dated Oct. 15, 2020", 12 pgs.

"Surprise!", [Online] Retrieved from the Internet: <URL: https://www.snap.com/en-US/news/post/surprise>, (Oct. 3, 2013), 1 pg.

Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.

Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.

(56) References Cited

OTHER PUBLICATIONS

Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.

"U.S. Appl. No. 16/503,783, Corrected Notice of Allowability dated Sep. 2, 2021", 2 pgs.

"U.S. Appl. No. 16/835,080, Examiner Interview Summary dated Jan. 11, 2022", 3 pgs.

"U.S. Appl. No. 16/835,080, Non Final Office Action dated Oct. 8, 2021", 12 pgs.

"U.S. Appl. No. 16/835,080, Notice of Allowance dated Feb. 9, 2022", 9 pgs.

"U.S. Appl. No. 16/835,080, Response filed Jan. 10, 2022 to Non Final Office Action dated Oct. 8, 2021", 12 pgs.

"U.S. Appl. No. 16/856,811, Final Office Action dated Dec. 27, 2021", 21 pgs.

"U.S. Appl. No. 16/856,811, Response filed Sep. 9, 2021 to Non Final Office Action dated Jun. 9, 2021", 11 pgs.

"U.S. Appl. No. 16/835,080, 312 Amendment filed May 9, 2022", 8 pgs.

"U.S. Appl. No. 16/835,080, PTO Response to Rule 312 Communication dated May 16, 2022", 2 pgs.

"U.S. Appl. No. 16/856,811, Non Final Office Action dated May 11, 2022", 23 pgs.

"U.S. Appl. No. 16/856,811, Response filed Apr. 27, 22 to Final Office Action dated Dec. 27, 2021", 10 pgs.

\* cited by examiner

EVENT PLANNING IN A CONTENT SHARING PLATFORM

CLAIM OF PRIORITY

This application is a continuation of U.S. application Ser. No. 16/503,783, filed Jul. 5, 2019, which is hereby incorporated by reference in its entirety.

BACKGROUND

A content sharing platform may receive millions of messages from users desiring to share media content such as audio, images, and video between user devices (e.g., mobile devices, personal computers). A content sharing platform may further allow users to "chat" with other users by exchanging text messages.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to event planning functionality in a content sharing platform (e.g., a social media platform). As explained above, a content sharing platform may receive millions of messages from users desiring to share media content such as audio, images, and video between user devices (e.g., mobile devices, personal computers, etc.). For example, a user can capture media content, such as an image or video, augment the image or video (e.g., with text, audio, media overlay or other creative tools) and then send a message comprising the augmented image or video to one or more other users. The user can view messages comprising media content from other users and also discover and view media content (e.g., messages and media collections) generated by other users or entities related to a particular interest or topic (e.g., sports, celebrities, food, events). A content sharing platform may further allow users to "chat" with other users by exchanging text messages.

Event planning in such a content sharing platform, however, is difficult to do. For example, a user can send a message to one or more users inviting them to a holiday barbeque or surprise party for a friend, but there is no easy way to surface important details about the event (e.g., date, time, location), notify users about updates to the event, show events on a map, or otherwise provide an easy way to plan and organize an event.

Example embodiments provide functionality in a content sharing platform for event planning. For example, a user can create a custom event invite media overlay that includes content for an event. The custom event invite media overlay can be displayed on a media content item (e.g., an image or video) and sent as an invite to one or more other users. A user receiving the invite can join the event, chat with others that have joined the event, receive notifications about the event (e.g., updates to the event, new users joining the event), forward the invite to other users, and so forth. Events (e.g., actions) corresponding to the event can be logged by a server system (e.g., when a user joins the event, when a user invites another user to the event, when details of the event change). Visual indicators of users attending the event can be displayed on a map on the event location. Moreover, users attending the event can capture media content items that can be automatically added to a media collection for the event group. Accordingly, example embodiments include an infrastructure to allow impromptu hangouts with small groups of friends in an informal fashion (e.g., to grab lunch that day, to go to the movies after work, to grab drinks after work) to more formal invites, such as for birthday parties or other events.

Figure 1:
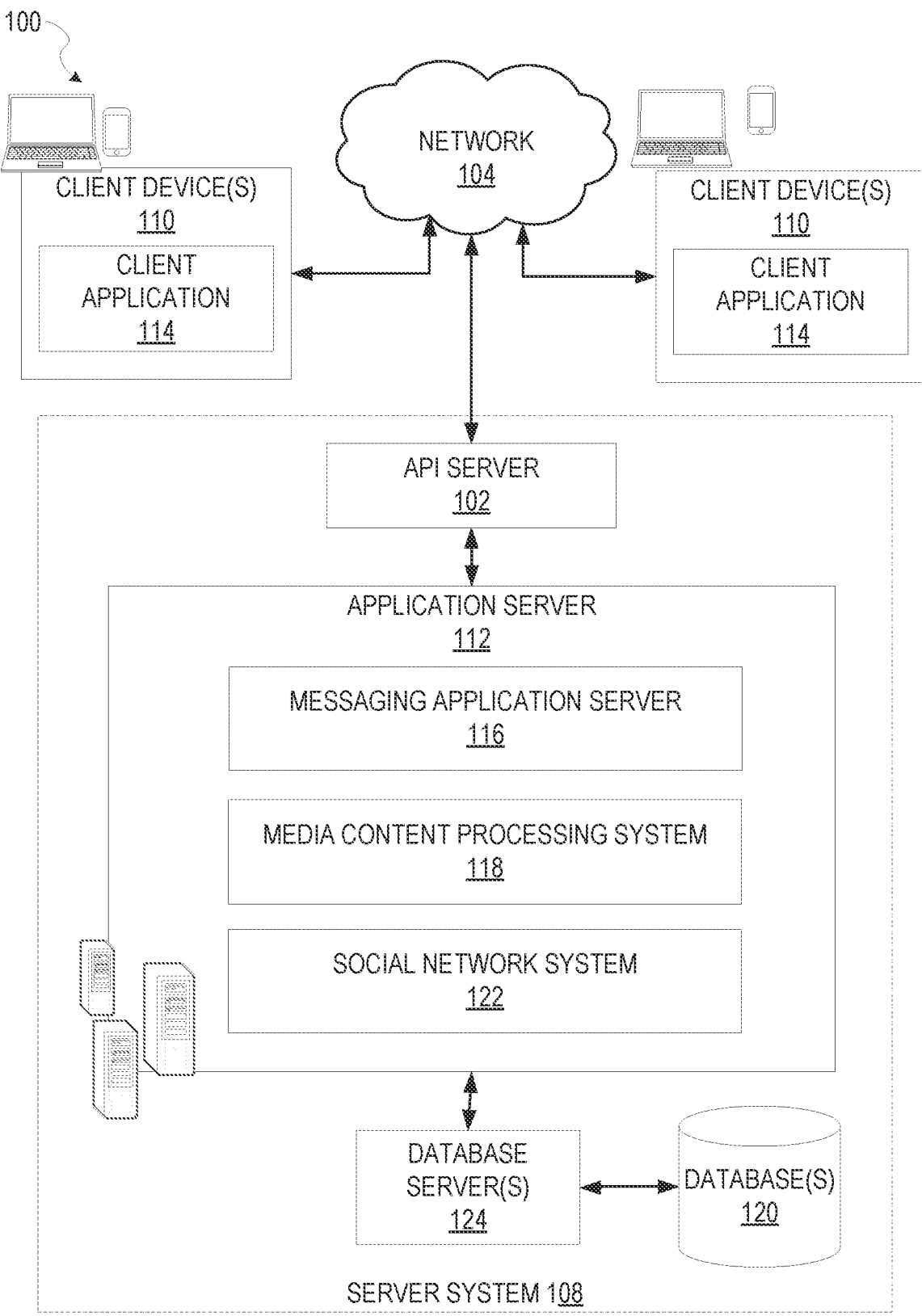
FIG. 1 is a block diagram showing an example networked system for exchanging data (e.g., messages and associated content) over a network, according to some example embodiments.

FIG. 1 is a block diagram illustrating a networked system 100 (e.g., a content sharing platform or messaging system) for exchanging data (e.g., messages and associated content) over a network. The networked system 100 includes multiple client devices 110, each of which hosts a number of client applications 114. Each client application 114 is communicatively coupled to other instances of the client application 114 and a server system 108 via a network 104.

The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, wearable device, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, Global Positioning System (GPS) devices, and so forth.

The client device 110 may be a device of a user that is used to create media content items such as video, images (e.g., photographs), audio, and media overlays and to send and receive messages containing such media content items, text, media overlays, and so forth, to and from other users. The client device 110 may be a device of a user that is used to create and edit messages comprising media content, including video, one or more images (e.g., photographs), media overlays or other creative tools, text, and so forth. The client device 110 may further be a device of a user that is used to view and generate interactive messages, view other users on a map, chat (e.g., exchange text messages) with other users of the system, generate and view event invites, join an event, receive notifications related to an event, and so forth.

One or more users may be a person, a machine, or other means of interacting with the client device 110. In example embodiments, the user may not be part of the system 100 but may interact with the system 100 via the client device 110 or other means. For instance, the user may provide input (e.g., touch screen input or alphanumeric input) to the client device 110, and the input may be communicated to other entities in the system 100 (e.g., third-party servers, the server system 108, etc.) via the network 104. In this instance, the other entities in the system 100, in response to receiving the input from the user, may communicate information to the client device 110 via the network 104 to be presented to the user. In this way, the user may interact with the various entities in the system 100 using the client device 110.

The system 100 may further include the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WI-FI network, a WiMax network, another type of network, or a combination of two or more such networks.

The client device 110 may access the various data and applications provided by other entities in the system 100 via a web client (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, a messaging application, an electronic mail (email) application, an e-commerce site application, a mapping or location application, a media overlay application, an interactive messaging application, an image or video capture application, an event planning application, and the like.

In some embodiments, one or more client applications 114 may be included in a given one of the client devices 110, and configured to locally provide a user interface and at least some of the functionalities of the application, with the client application 114 configured to communicate with other entities in the system 100 (e.g., third-party servers, the server system 108, etc.), on an as-needed basis, for data and/or processing capabilities not locally available (e.g., to process user queries, to authenticate a user, to verify a method of payment, etc.). Conversely, one or more client applications 114 may not be included in the client device 110, and then the client device 110 may use its web browser to access the one or more applications hosted on other entities in the system 100 (e.g., third-party servers, the server system 108, etc.).

In one example, a client application 114 may be a messaging application that allows a user to take a photograph or video, add a caption or otherwise edit the photograph or video, and then send the photograph or video to another user. In one example, the message may be ephemeral and be removed from a receiving user device after viewing or after a predetermined amount of time (e.g., 10 seconds, 24 hours). An ephemeral message refers to a message that is accessible for a time-limited duration. An ephemeral message may be a text, an image, a video, and other such content that may be stitched or joined together in accordance with embodiments described herein. The access time for the ephemeral message may be set by the message sender. Alternatively, the access time may be a default setting or a setting specified by the recipient. Regardless of the setting technique, the message is transitory.

The messaging application may further allow a user to create a gallery or message collection. A gallery may be a collection of photos and videos which may be viewed by other users "following" the user's gallery (e.g., subscribed to view and receive updates in the user's gallery). In one example, the gallery may also be ephemeral (e.g., lasting 24 hours, lasting for a duration of an event (e.g., during a music concert, sporting event), or lasting another predetermined time).

An ephemeral message may be associated with a message duration parameter, the value of which determines an amount of time that the ephemeral message will be displayed to a receiving user of the ephemeral message by the client application 114. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user to store photographs and videos and create a gallery that is not ephemeral and that can be sent to other users. For example, a user may assemble photographs and videos from a recent vacation to share with friends and family.

The server system 108 may provide server-side functionality via the network 104 (e.g., the Internet or a wide area network (WAN)) to one or more client devices 110 and/or one or more third-party servers (not shown). The server system 108 may include an application programming interface (API) server 102, an application server 112, a messaging application server 116, a media content processing system 118, and a social network system 122, which may be communicatively coupled with each other and with one or more data storages, such as one or more databases 120.

The server system 108 may be a cloud computing environment, according to some example embodiments. The server system 108, and any servers associated with the server system 108, may be associated with a cloud-based application, in one example embodiment.

The one or more databases 120 may be storage devices that store information such as untreated media content, original media content from users (e.g., high-quality media content), processed media content (e.g., media content that is formatted for sharing with client devices 110 and viewing on client devices 110), context data related to a media content item, context data related to a user device (e.g., a computing or client device 110), media overlays, media overlay smart widgets or smart elements, user data, user device information, media content (e.g., video and images), media content data (e.g., data associated with video and images), computing device context data, serialized data, session data items, user device location data, mapping information, interactive message usage data, interactive message metrics data, event details and tokens, and so forth. The one or more databases 120 may further store information related to third-party servers, third-party applications, client devices 110, client applications 114, users, and so forth.

The one or more databases 120 may include cloud-based storage external to the server system 108 (e.g., hosted by one or more third-party entities external to the server system 108). While the storage devices are shown as database(s) 120, it is to be understood that the system 100 may access and store data in storage devices such as databases 120, blob storages, and other types of storage methods.

The system 100 may further include one or more third-party servers (not shown). The one or more third-party servers may include one or more third-party applications. The one or more third-party applications, executing on the third-party server(s), may interact with the server system 108 via the API server 102 via a programmatic interface provided by the API server 102. For example, one or more of the third-party applications may request and utilize information from the server system 108 via the API server 102 to support one or more features or functions on a website hosted by a third party or an application hosted by the third party. The third-party website or application, for example, may provide functionality that is supported by relevant functionality and data in the server system 108.

Accordingly, each client application 114 is able to communicate and exchange data with other client applications 114 and with the server system 108 via the network 104. The data exchanged between client applications 114, and between a client application 114 and the server system 108, includes functions (e.g., commands to invoke functions) as well as payload data (e.g., text, audio, video, or other multimedia data).

The server system 108 provides server-side functionality via the network 104 to a particular client application 114. While certain functions of the system 100 are described herein as being performed either by a client application 114 or by the server system 108, it will be appreciated that the location of certain functionality either within the client application 114 or within the server system 108 is a design choice. For example, it may be technically preferable to initially deploy certain technology and functionality within the server system 108, but to later migrate this technology and functionality to the client application 114 where a client device 110 has a sufficient processing capacity.

The server system 108 supports various services and operations that are provided to the client application 114. Such operations include transmitting data to, receiving data from, and processing data generated by the client application 114. This data may include message content, client device information, geolocation information, media annotation and overlays, message content persistence conditions, social network information, live event information, date and time stamps, media content (e.g., video and images), media content data (e.g., data associated with video and images), and interactive message usage data, event planning data, as examples. Data exchanges within the networked system 100 are invoked and controlled through functions available via user interfaces (UIs) of the client application 114.

In the server system 108, the API server 102 is coupled to, and provides a programmatic interface to, the application server 112. The application server 112 is communicatively coupled to a database server 124, which facilitates access to the one or more databases 120 in which is stored data associated with messages processed by the application server 112.

The API server 102 receives and transmits message data (e.g., commands and message payloads) between the client device 110 and the application server 112. Specifically, the API server 102 provides a set of interfaces (e.g., routines and protocols) that can be called or queried by the client application 114 in order to invoke functionality of the application server 112. The API server 102 exposes various functions supported by the application server 112, including account registration; login functionality; the sending of messages, via the application server 112, from a particular client application 114 to another client application 114; the sending of media files (e.g., images or video) from a client application 114 to the messaging application server 116, for possible access by another client application 114; the setting of a collection of media data (e.g., a gallery, story, message collection, or media collection); the retrieval of such collections; the retrieval of a list of friends of a user of a client device 110; the retrieval of messages and content; the adding of friends to and deletion of friends from a social graph; the location of friends within a social graph; opening an application event (e.g., relating to the client application 114); mapping data; the creation and generation of a media overlay, and so forth.

The application server 112 hosts a number of applications and subsystems, including the messaging application server 116, the media content processing system 118, and the social network system 122. The messaging application server 116 implements a number of message processing technologies and functions, particularly related to the aggregation and other processing of content (e.g., textual and multimedia content) included in messages received from multiple instances of the client application 114. The text and media content from multiple sources may be aggregated into collections of content (e.g., called stories, galleries, or media collections). These collections are then made available, by the messaging application server 116, to the client application 114. Other processor- and memory-intensive processing of data may also be performed server-side by the messaging application server 116, in view of the hardware requirements for such processing.

The application server 112 also includes the media content processing system 118, which is dedicated to performing various media content processing operations, typically with respect to images or video received within the payload of a message at the messaging application server 116. The media content processing system 118 may access one or more data storages (e.g., the database(s) 120) to retrieve stored data to use in processing media content and to store results of processed media content.

The social network system 122 supports various social networking functions and services, and makes these functions and services available to the messaging application server 116. To this end, the social network system 122 maintains and accesses an entity graph 304 (depicted in FIG. 3) within the database(s) 120. Examples of functions and services supported by the social network system 122 include the identification of other users of the networked system 100 with whom a particular user has relationships or whom the particular user is "following," and also the identification of other entities and interests of a particular user.

The messaging application server 116 may be responsible for generation and delivery of messages between users of client devices 110. The messaging application server 116 may utilize any one of a number of message delivery networks and platforms to deliver messages to users. For example, the messaging application server 116 may deliver messages using electronic mail (email), instant messaging (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth).

Figure 2:
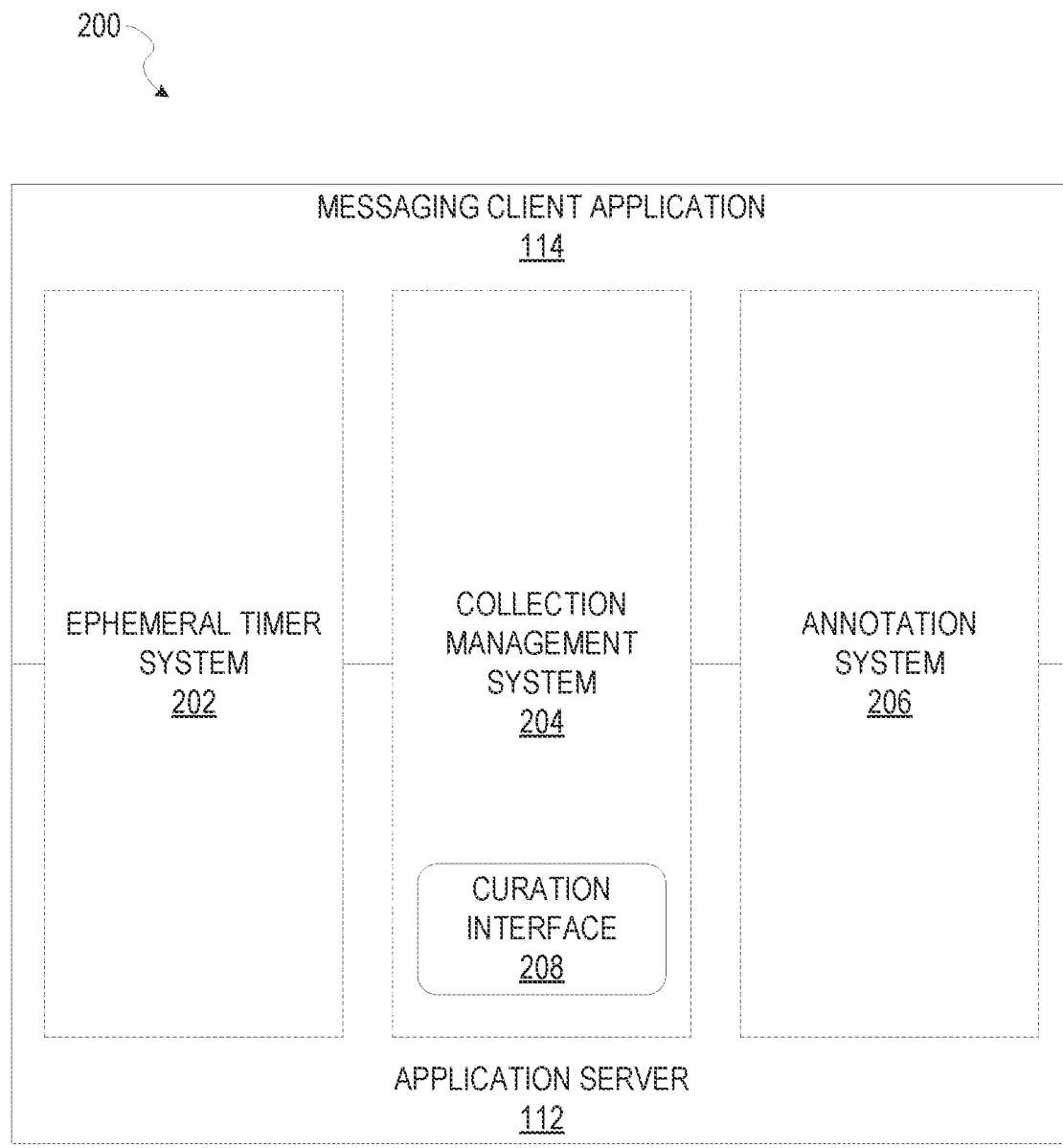
FIG. 2 is a block diagram illustrating further details regarding the messaging system, according to some example embodiments.

FIG. 2 is a block diagram 200 illustrating further details regarding the system 100, according to example embodiments. Specifically, the system 100 is shown to comprise the messaging client application 114 and the application server 112, which in turn embody a number of subsystems, namely an ephemeral timer system 202, a collection management system 204, and an annotation system 206.

The ephemeral timer system 202 is responsible for enforcing the temporary access to content permitted by the messaging client application 114 and the messaging application server 116. To this end, the ephemeral timer system 202 incorporates a number of timers that, based on duration and display parameters associated with a message, or a collection of messages (e.g., otherwise referred to herein as "media collections," "galleries," "message collections," "stories," and the like), selectively display and enable access to messages and associated content via the messaging client application 114.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 114.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation (e.g., money, non-money credits or points associated with the messaging system or a third-party reward system, travel miles, access to artwork or specialized lenses, etc.) may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the networked system 100. In one example, the annotation system 206 operatively supplies a media overlay (e.g., a filter or media augmentation) to the messaging client application 114 based on a geolocation of the client device 110. In another example, the annotation system 206 operatively supplies a media overlay to the messaging client application 114 based on other information, such as social network information of the user of the client device 110. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 110. For example, the media overlay includes text that can be overlaid on top of a photograph taken by the client device 110. In another example, the media overlay includes an identification of a location overlay (e.g., Venice Beach), a name of a live event, a name of a merchant overlay (e.g., Beach Coffee House), or of a home of a user. In another example, the annotation system 206 uses the geolocation of the client device 110 to identify a media overlay that includes the name of a merchant at the geolocation of the client device 110. The media overlay may include other indicia associated with the merchant. The media overlays may be stored in the database(s) 120 and accessed through the database server 124.

The annotation system 206 may further enable a user to interact with an interactive message, such as by adding one or more media content items to the interactive message, as described in further detail below. In one example embodiment, the annotation system 206 provides a publication platform that allows a user or merchant to create an interactive message with a plurality of objects associated with the interactive message for which users may add personal content. For example, a designer may create a video of a rock band with various interactive objects for different members of the band (a drummer, a keyboard player, a guitarist, etc.). The video of the rock band may be made available to users as an interactive message.

In one example embodiment, the annotation system 206 provides a user-based publication platform that enables users to select a geolocation on a map and upload content associated with the selected geolocation. The user may also specify circumstances under which a particular media overlay is to be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

Figure 3:
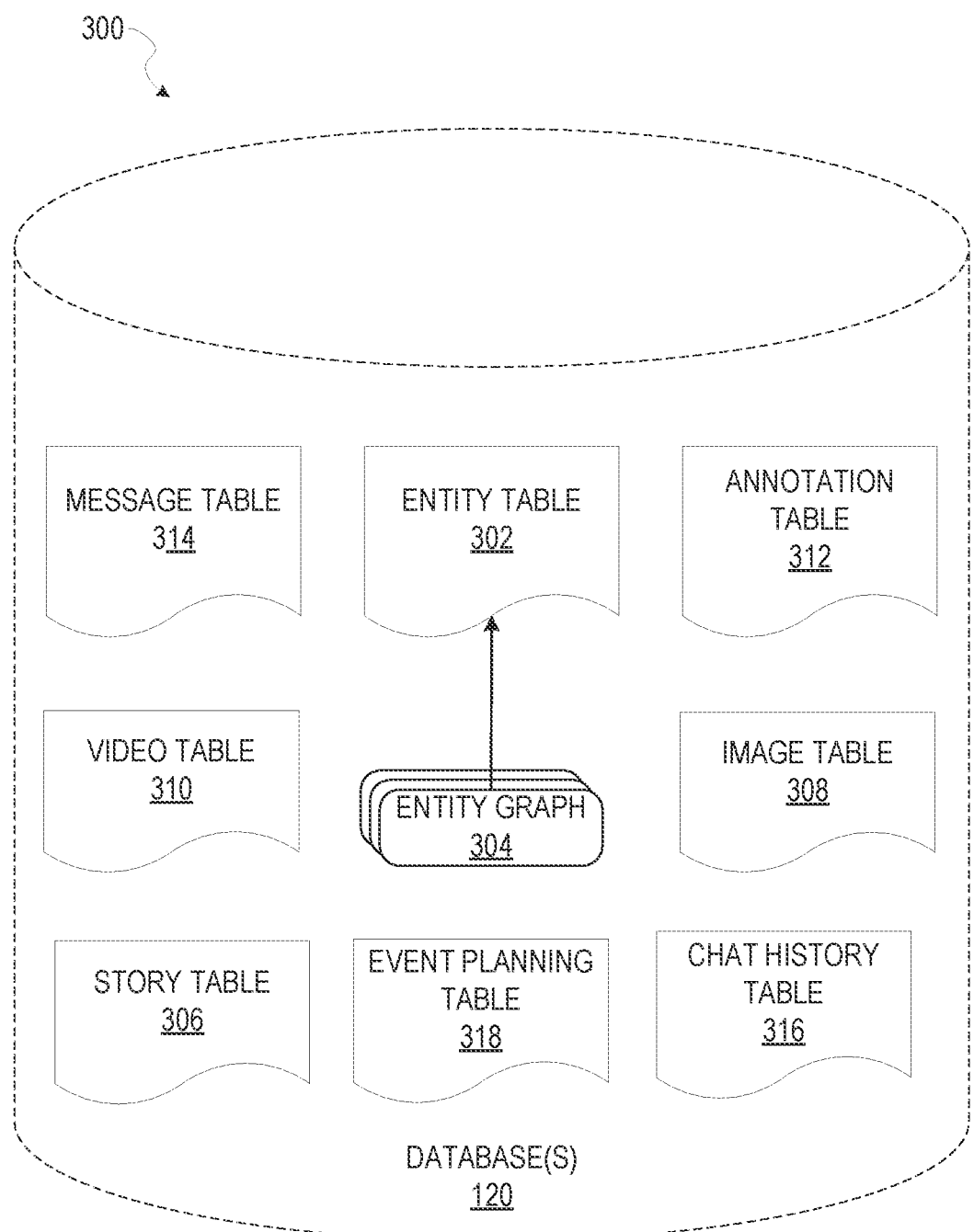
FIG. 3 is a schematic diagram illustrating data which may be stored in a database of a messaging server system, according to some example embodiments.

FIG. 3 is a schematic diagram 300 illustrating data which may be stored in the database(s) 120 of the server system 108, according to certain example embodiments. While the content of the database(s) 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based, or activity-based, merely for example.

The database 120 also stores annotation data, in the example form of media overlays or filters, in an annotation table 312. Annotation data may also be referred to herein as "creative tools" or "interactive features." Annotation data may comprise predefined interactive messages to be provided to users.

Media overlays or filters, for which data is stored within the annotation table 312, are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 114 when the sending user is composing a message. Other types of filters include geolocation filters (also known as "geo-filters"), which may be presented to a sending user based on geographic location. For example, geolocation filters specific to a neighborhood or special location may be presented within a user interface by the messaging client application 114, based on geolocation information determined by a GPS unit of the client device 110. Another type of filter is a data filter, which may be selectively presented to a sending user by the messaging client application 114, based on other inputs or information gathered by the client device 110 during the message creation process. Examples of data filters include a current temperature at a specific location, a current speed at which a sending user is traveling, a battery life for a client device 110, or the current time.

Other annotation data that may be stored within the annotation table 312 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story, gallery, or media collection). The creation of a particular collection may be initiated by a particular user (e.g., any user for whom a record is maintained in the entity table 302). A user may create a "personal story" in the form of a collection of content that has been created and sent/broadcast by that user. To this end, the user interface of the messaging client application 114 may include an icon that is user-selectable to enable a sending user to add specific content to his or her personal story.

A media or message collection may also constitute a "live story," which is a collection of content from multiple users that is created manually, automatically, or using a combination of manual and automatic techniques. For example, a "live story" may constitute a curated stream of user-submitted content from various locations and events. Users whose client devices 110 have location services enabled and are at a common event location at a particular time may, for example, be presented with an option, via a user interface of the messaging client application 114, to contribute content to a particular live story. The live story may be identified to the user by the messaging client application 114, based on his or her location. The end result is a "live story" told from a community perspective.

A further type of content collection is known as a "location story," which enables a user whose client device 110 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

A chat history table 316 stores data related to text messages exchanged between users in a "chat" session via the messaging application. For example, the chat history table 316 stores all the messages exchanged between users, or all messages for a predefined time period (e.g., last hour, day, week, month, year), so that a user may view a history of text messages the user exchanged between one or more other users.

An event planning table 318 stores data related to an event. For example, the event planning table 318 stores details of an event, logged events (e.g., actions) corresponding to the event (e.g., when a user joins the event, when a user invites another users, when details of the event change), links to chat sessions for the event (e.g., a link to chat sessions in the chat history table 316), tokens for the event, and so forth.

Figure 4:
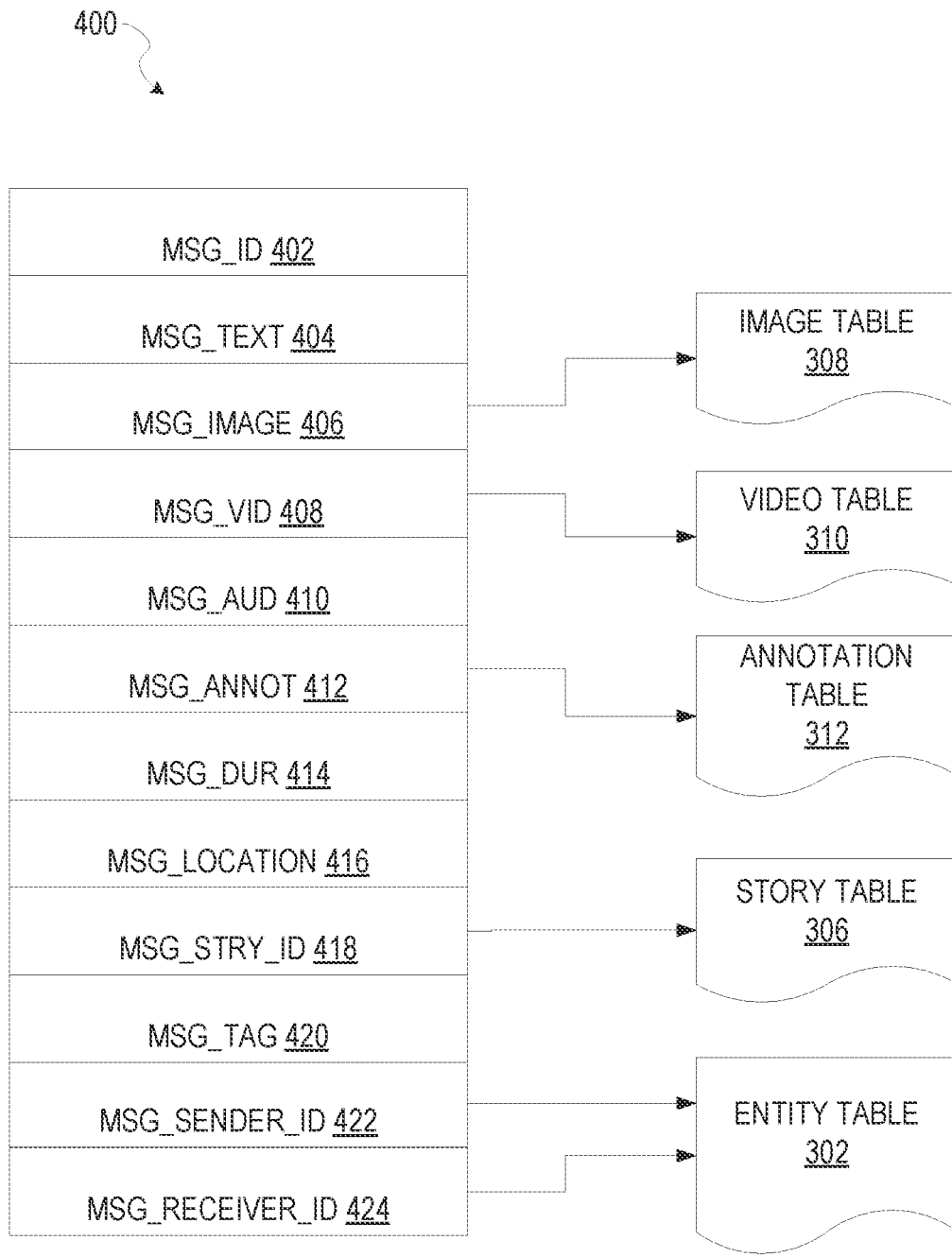
FIG. 4 is a schematic diagram illustrating a structure of a message, according to some embodiments, generated by a messaging client application for communication.

FIG. 4 is a schematic diagram illustrating a structure of a message 400, according to some embodiments, generated by a client application 114 for communication to a further client application 114 or the messaging application server 116. The content of a particular message 400 is used to populate the message table 314 stored within the database(s) 120, accessible by the messaging application server 116. Similarly, the content of a message 400 is stored in memory as "in-transit" or "in-flight" data of the client device 110 or the application server 112. The message 400 is shown to include the following components:

A message identifier 402: a unique identifier that identifies the message 400.

A message text payload 404: text, to be generated by a user via a user interface of the client device 110 and that is included in the message 400.

A message image payload 406: image data, captured by a camera component of a client device 110 or retrieved from memory of a client device 110, and that is included in the message 400.

A message video payload 408: video data, captured by a camera component or retrieved from a memory component of the client device 110 and that is included in the message 400.

A message audio payload 410: audio data, captured by a microphone or retrieved from the memory component of the client device 110, and that is included in the message 400.

Message annotations 412: annotation data (e.g., media overlays such as filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 114.

A message geolocation parameter 416: geolocation data (e.g., latitudinal and longitudinal coordinates) associated with the content payload of the message 400. Multiple message geolocation parameter 416 values may be included in the payload, each of these parameter values being associated with respective content items included in the content (e.g., a specific image within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420; each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 110 on which the message 400 was generated and from which the message 400 was sent.

A message receiver identifier 424: an identifier (e.g., a messaging system identifier, email address, or device identifier) indicative of a user of the client device 110 to which the message 400 is addressed.

An event token (not shown): an identifier (e.g., randomly generated number) indicative of the event.

The contents (e.g., values) of the various components of the message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
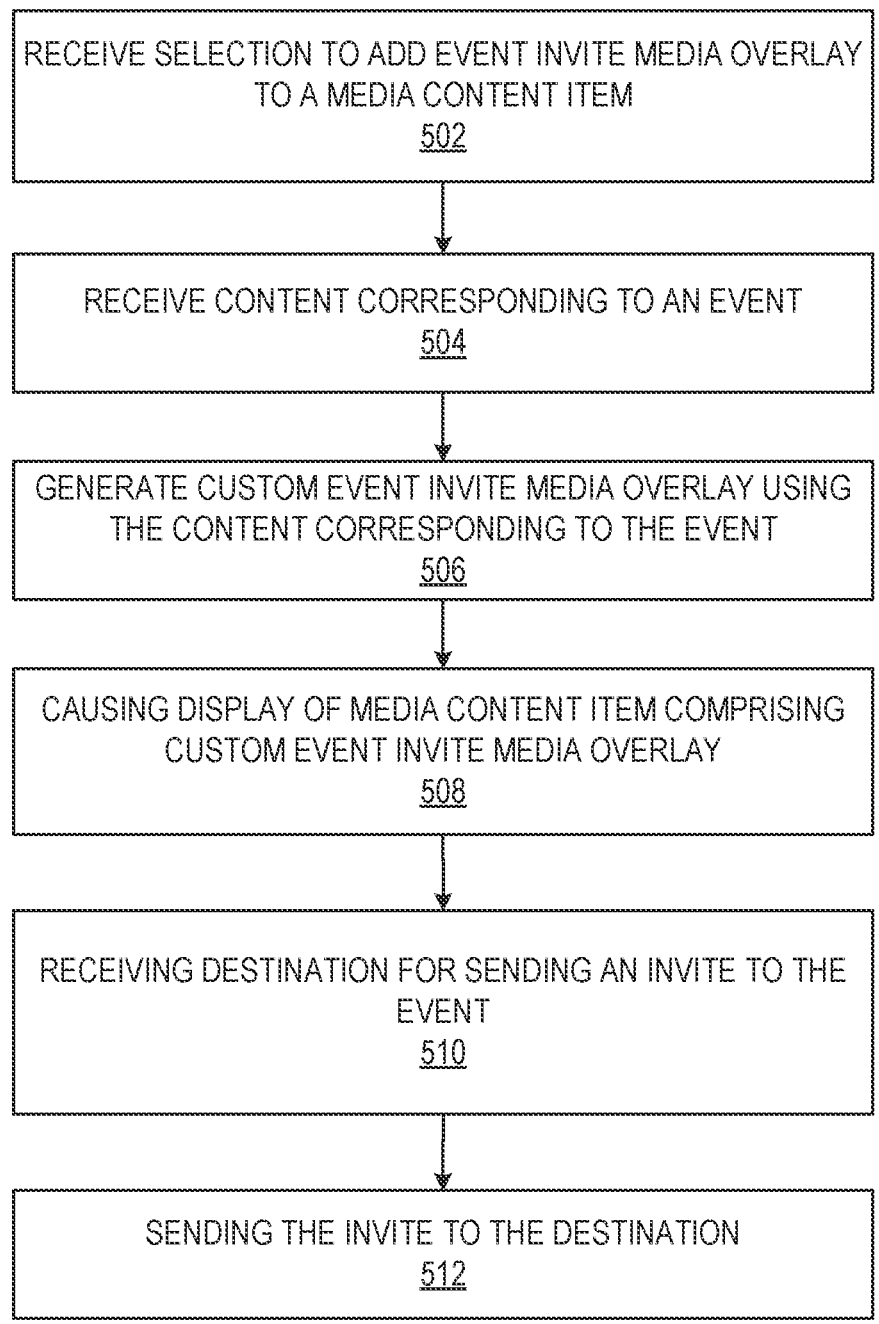
FIG. 5 is a flow chart illustrating aspects of a method, according to some example embodiments.

FIG. 5 is a flow chart illustrating aspects of a method 500, according to some example embodiments. For illustrative purposes, the method 500 is described with respect to the networked system 100 of FIG. 1. It is to be understood that the method 500 may be practiced with other system configurations in other embodiments.

Figure 6:
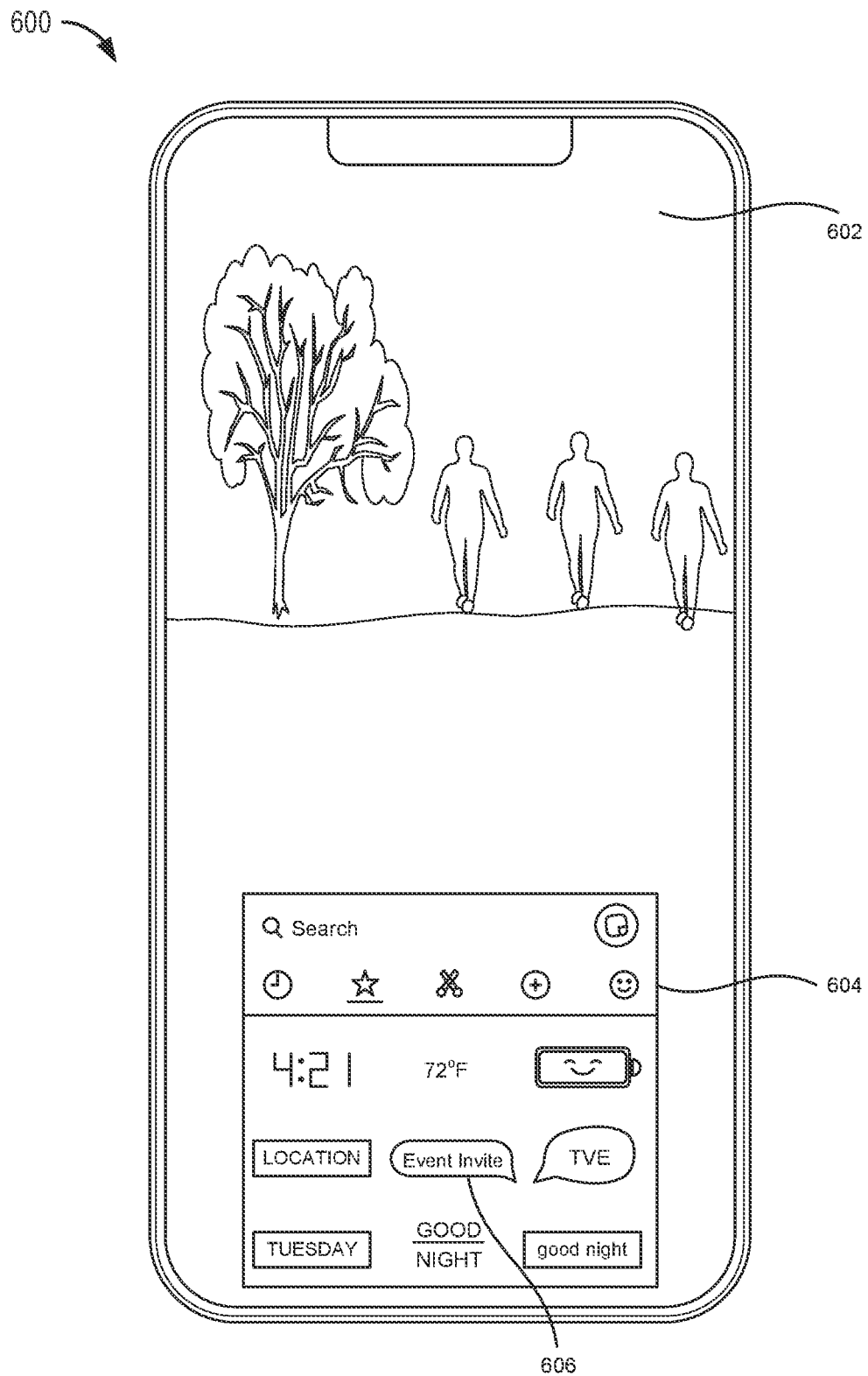
FIGS. 6-21 illustrate example graphical user interfaces (GUIs), according to some example embodiments.

In operation 502, a computing device (e.g., client device 110) receives a selection (e.g., a selection of an option or interface element) to add an event invite media overlay to a media content item. In one example embodiment, a user captures a media content item via a camera device of the computing device. For example, the user captures an image (e.g., photograph) or video. The computing device can display the captured image or video on a display area of the computing device and provide an option (e.g., an interface element) to add a media overlay to the captured media content item. FIG. 6 illustrates an example display 600 on the computing device (e.g., via a graphical user interface (GUI)) showing a media content item 602 captured by a camera device of the computing device and a menu 604 with options to choose a media overlay (e.g., in the form of a sticker). One of the options in the menu 604 is an option for an event invite media overlay 606. The user can choose one or more media overlays from the menu 604 to be added to the media content item 602 (e.g., to augment the media content item by overlaying the media overlay on top of the media content item).

Figure 7:
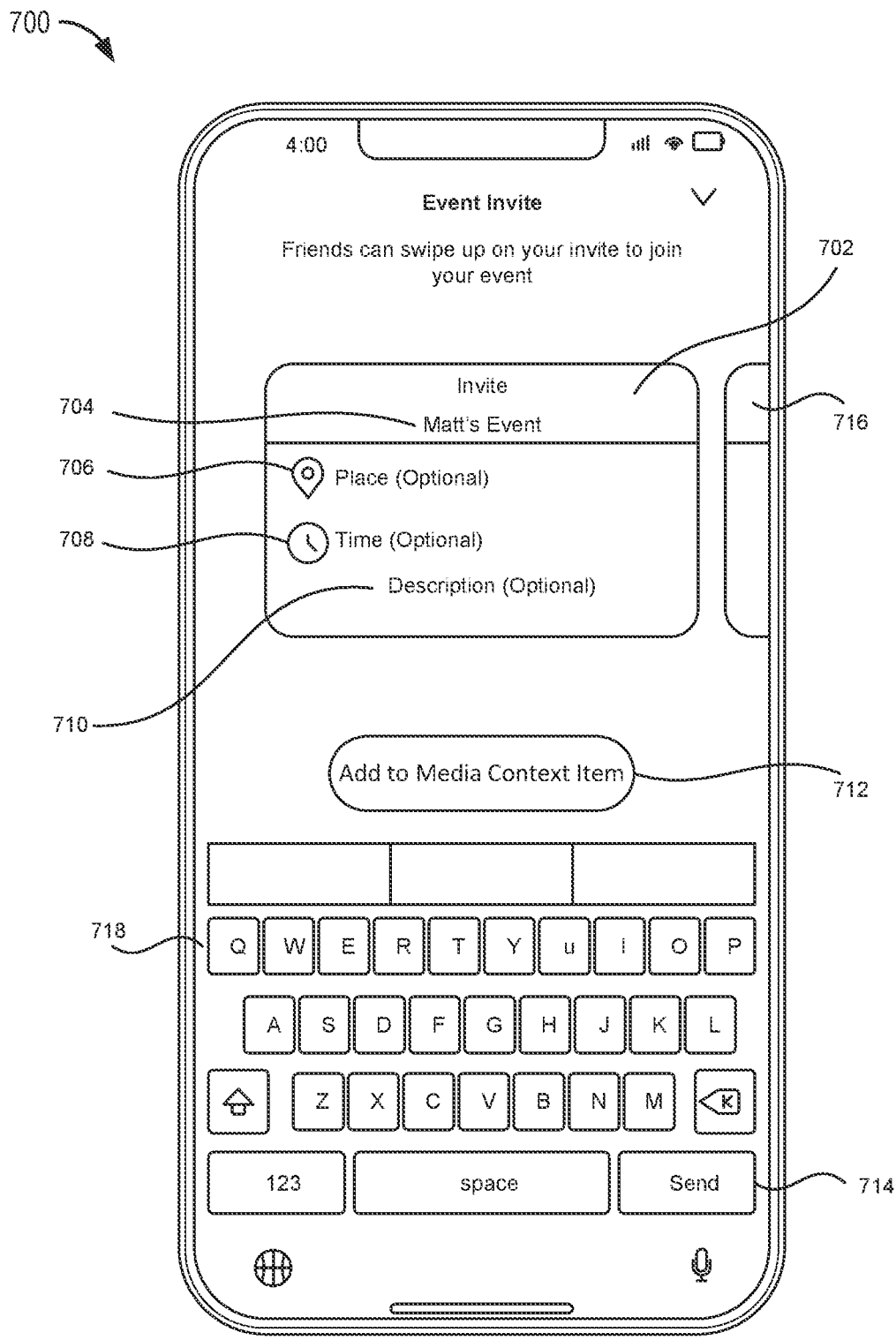

In one example, the user selects the event invite media overlay 606. The computing device receives the selection to add the event invite media overlay to the media content item in operation 502. The computing device causes display of a GUI to enter content (e.g., details) for an event corresponding to the event invite media overlay. FIG. 7 illustrates an example GUI 700 for entering content for an event corresponding to an event invite media overlay 702. For example, a user can enter a title 704 for the event, a location 706 (e.g., address) for the event, a time 708 for the event, and a description 710 for the event. It is noted that everything besides the title are optional, and thus, a user can quickly generate an event with very little information. In one example, the event title can even be optional and the computing device can generate a default tile (e.g., the user's name plus event (e.g., "Nate's Event" or "Sally's Event)) to make it even easier for the user.

In one example, the GUI 700 provides a mechanism to view other event invite media overlays that the user created previously. For example, the user can swipe to the right on the next event invite media overlay 716 to view and edit the event invite media overlay 716.

The user can enter any content for the event invite media overlay 702 via a keyboard 718 or other means. Once the user has completed entering any content in the event invite media overlay 702, the user can add it to the media content item (e.g., via a selection option 712). In one example, instead of adding the event invite media overlay 702 to the media content item, the user can send it directly to one or more users (e.g., via a selection option 714).

Once the user selects to add the event invite media overlay to the media content item, the computing device receives the content to be added to the event invite media overlay, in operation 504, and generates a custom event invite media overlay using the content corresponding to the event in operation 506. For example, the computing device adds the content corresponding to the event (e.g., title, location, date and time) to the event invite media overlay to create a custom event invite media overlay.

Figure 8:
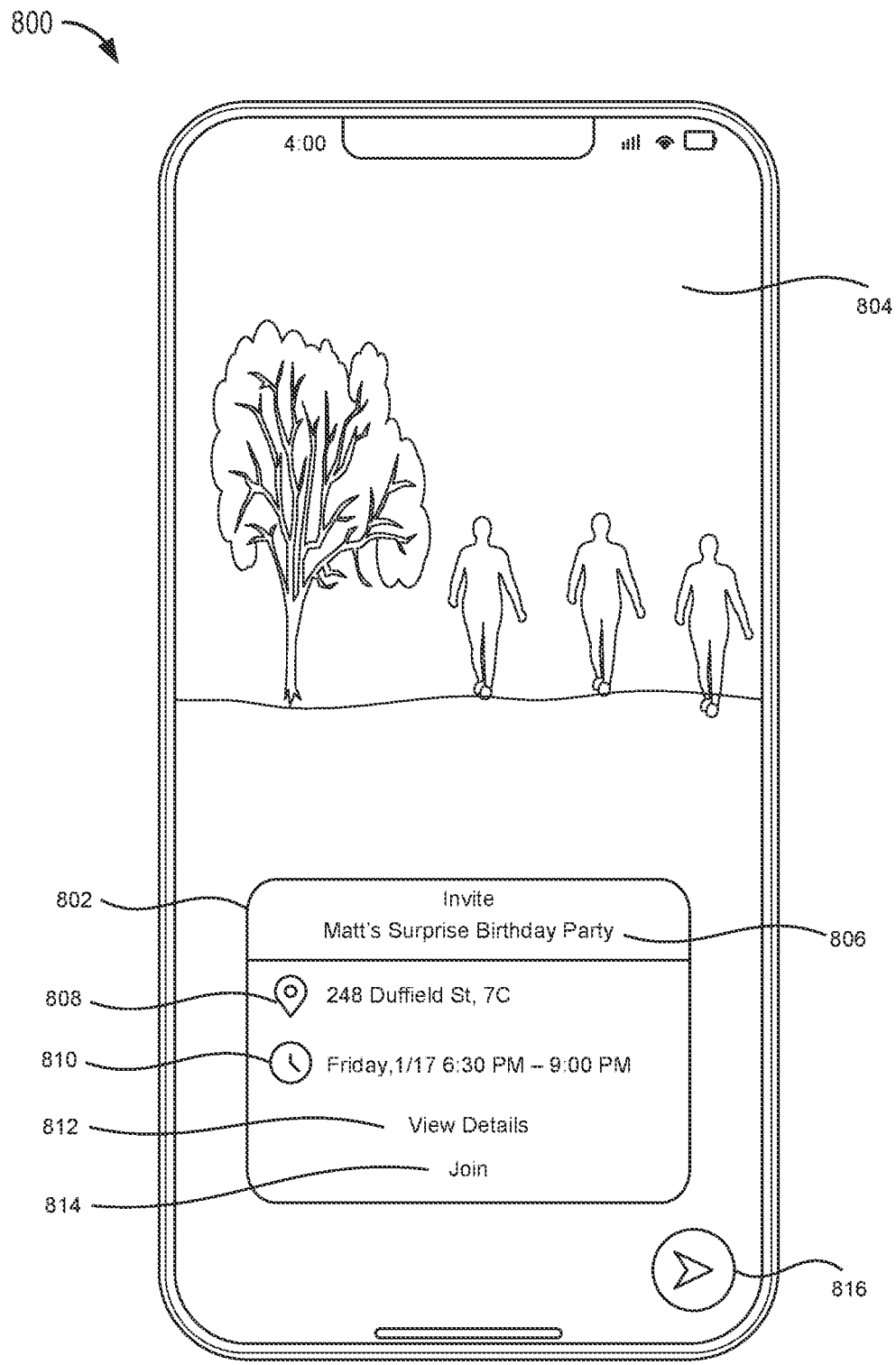

In operation 508, the computing device causes display of the custom event invite media overlay on the media content item. FIG. 8 illustrates an example GUI 800 displaying a custom event invite media overly 802 that is displayed on (e.g., overlaid on) a media content item 804. In this example, the custom event invite media overlay 802 shows an event title 806, an event location 808, an event date and time 810, an option 812 to view details of the event, and an option 814 to join the event. The GUI 800 further includes an option 816 to send the invite to a destination, such as one or more other users.

In one example embodiment, the user can move the event invite media overlay around to different locations on the media content item, rotate the event invite media overlay (e.g., so that it is at a different angle), reshape the event invite media overlay to make it smaller or larger, change the color of the event invite media overlay, change the font, and so forth. In some example embodiments, the event invite media overlay is automatically resized based on the content provided for the event. For example, if only a title is provided (or auto-generated), the event invite media overlay is resized to only show the title. Likewise, if only a title and location are provided, the event invited media overlay is resized to only show the title and location, and so forth, dependent upon the content provided.

Figure 9:
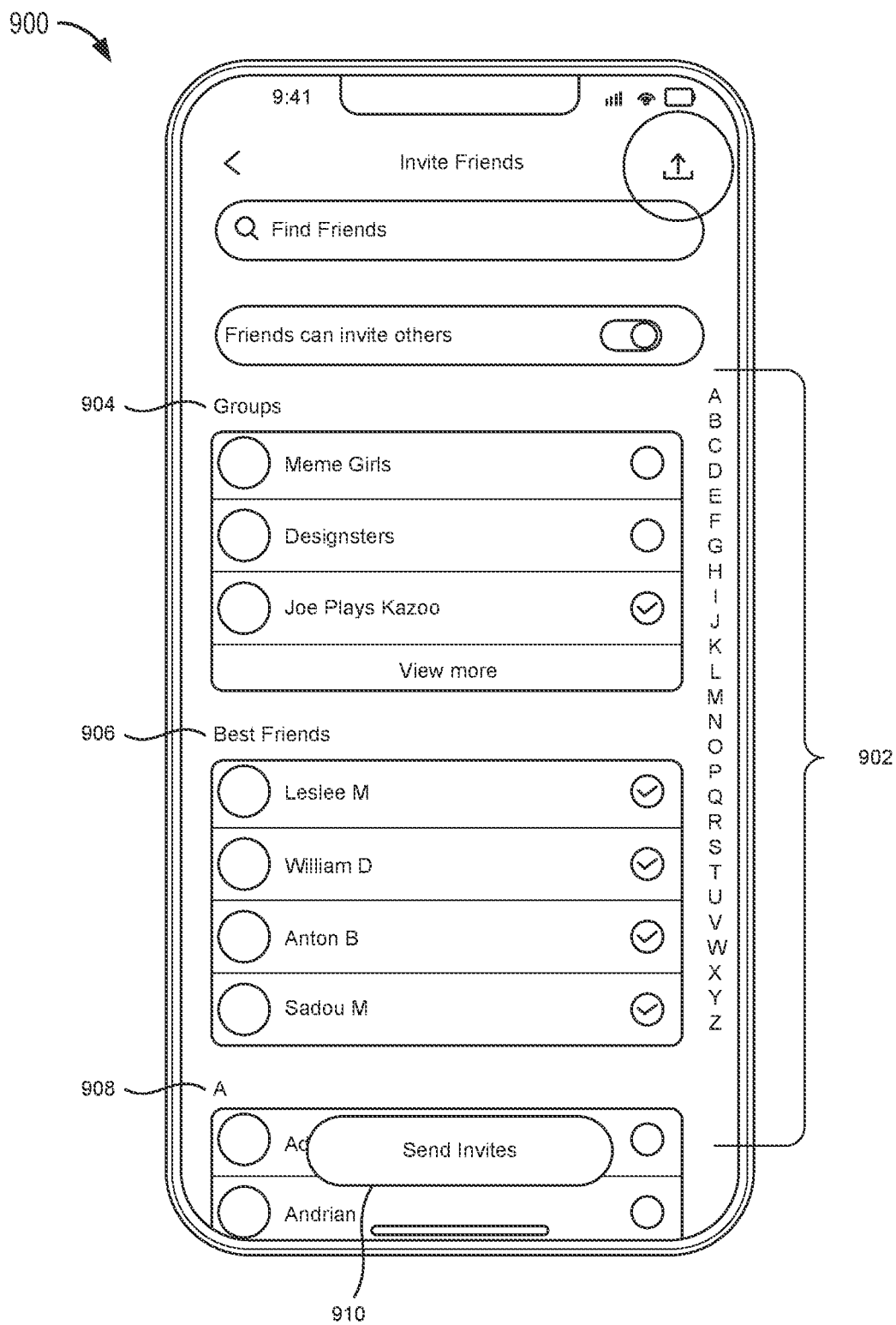

Once the user selects to send the invite to a destination (e.g., via option 816), the computing device can cause a display of a destination list from which the user can select one or more users to which to send the invite. FIG. 9 illustrates an example GUI 900 displaying a destination list 902 comprising groups 904 (e.g., predefined groups of users), best friends 906 (e.g., user-designated close friends), and contacts listed in alphabetical order 908. The user can select one or more groups and/or users to which to send the invite. The GUI 900 also provides an option 910 that the user can select to send the invite once the user has selected one or more groups and/or users to which to send the invite.

In operation 510, the computing device receives at least one destination (e.g., user or group of users) to which to send the invite to the event. In operation 512, the computing device then sends the invite to a second computing device associated with the at least one destination (e.g., a second user). The invite comprises the custom event invite media overlay and the media content item.

In one example, the computing device sends the invite via a computing system (e.g., server system 108) to the second computing device. In one example, the computing device also generates a secure token (e.g., a randomly generated number) that is associated with the invite. The computing device sends the token with the invite to the computing system. The invite comprises the media content item, the event invite media overlay, and any additional metadata associated with the invite. The computing system receives the invite and token and stores the invite and token in one or more datastores (e.g., databases 120). When users join the event, the same token is used to send a request to the computing system to join the event and the token will allow them to join the group. In one example, the computing system generates a new group for the event, the new group comprising the user that set up the event and any users that join the event (e.g., select to join the event via the invite). The users that join the event are added to the group when they elect to join the event.

Figure 10:
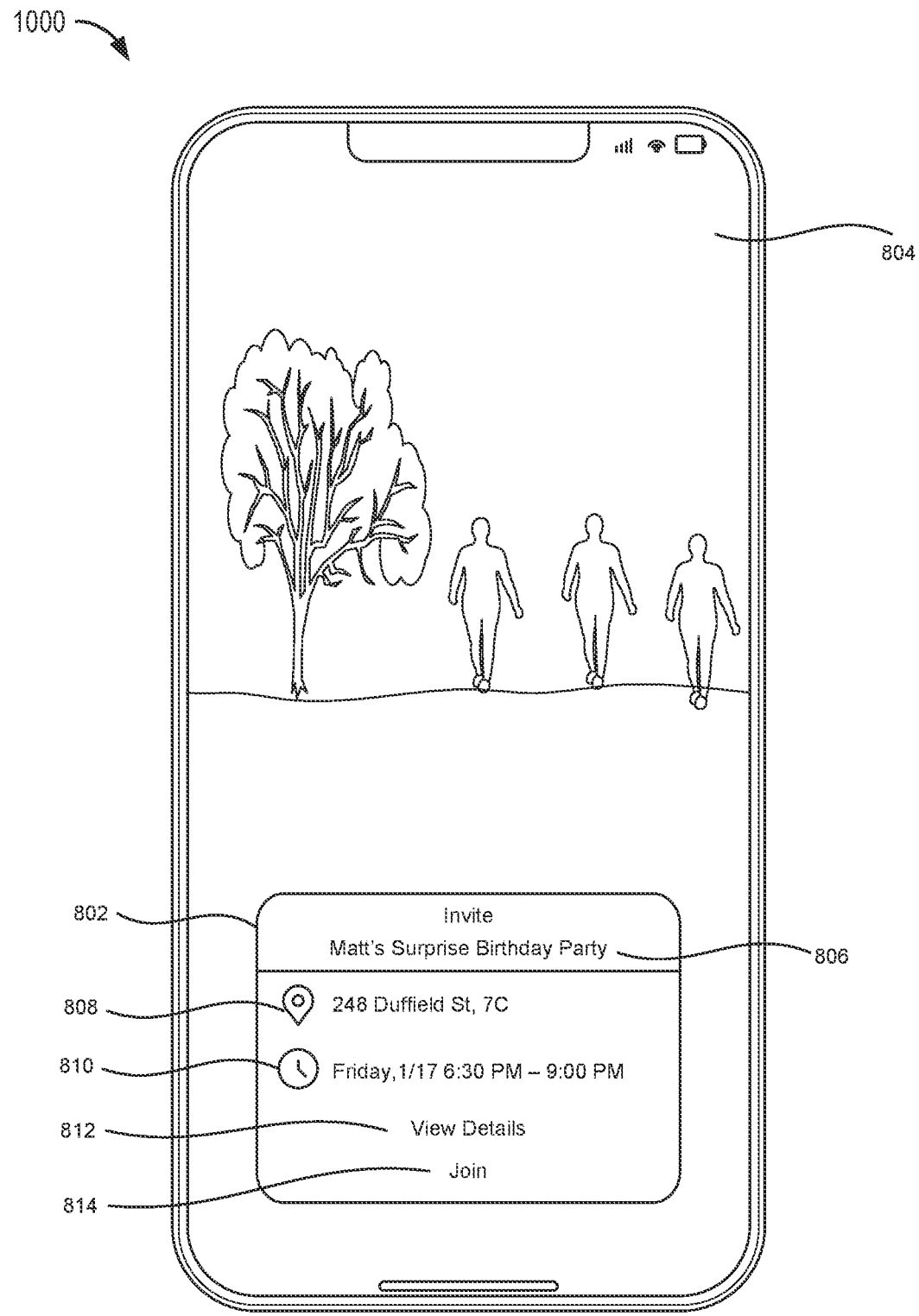

The custom event invite media overlay is displayed on the media content item on a user interface of a computing device associated with a user that has been invited to the event (e.g., the second computing device of the second user). FIG. 10 illustrates an example GUI 1000 displaying the custom event invite media overly 802 that is displayed on (e.g., overlaid on) a media content item 804. In this example, the custom event invite media overlay 802 shows an event title 806, an event location 808, an event date and time 810, an option 812 to view details of the event, and an option 814 to join the event.

Figure 11:
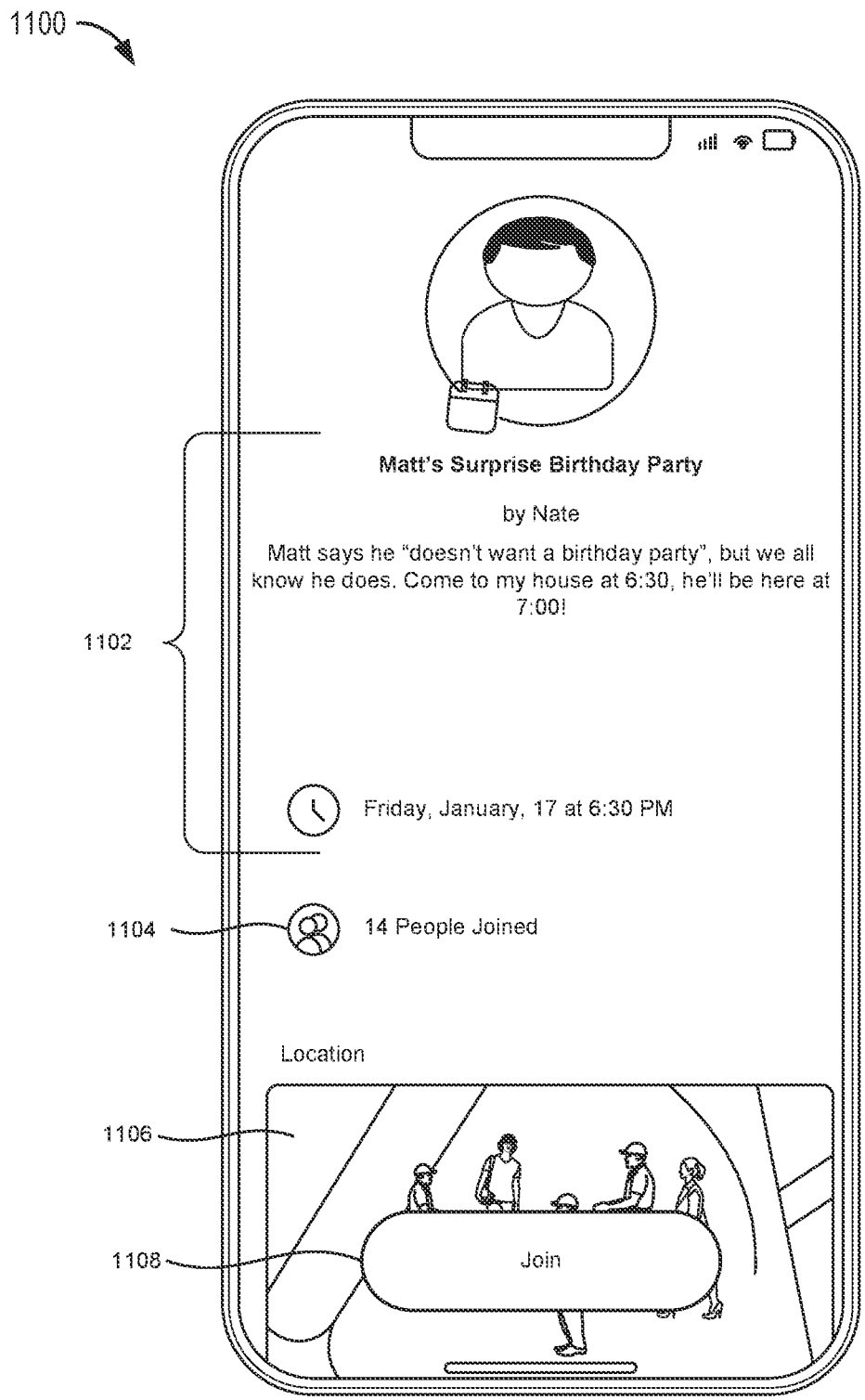

A user can select to view the details of the event (e.g., via option 812) and the computing device associated with the user can display the details of the event or join the event (e.g., via option 814). FIG. 11 illustrates an example GUI 1100 displaying the details of the event 1102, information 1104 on how many other users have joined, a map 1106 showing the location of the event, and an option 1108 to join the event. The map 1106 further shows locations of the users who have joined the event (e.g., showing an avatar representing each user).

Once the user selects to join the event, the computing device sends a request to the computing system (e.g., server system 108) along with the token corresponding to the event. The computing system receives the request and token, determines the corresponding event to the token, and adds the user to the event (e.g., as a member of the group for the event). The computing system logs information related to the user, such as the date and time the user joined the event. In one example, the computing system logs various events related to the event. For example, the computing system logs each time a new user is added (joins) an event and corresponding information, each time a user that has joined the event invites another user to the event and corresponding information, any time an event changes and what changes were made, communications between users via the event group, and so forth.

Figure 12:
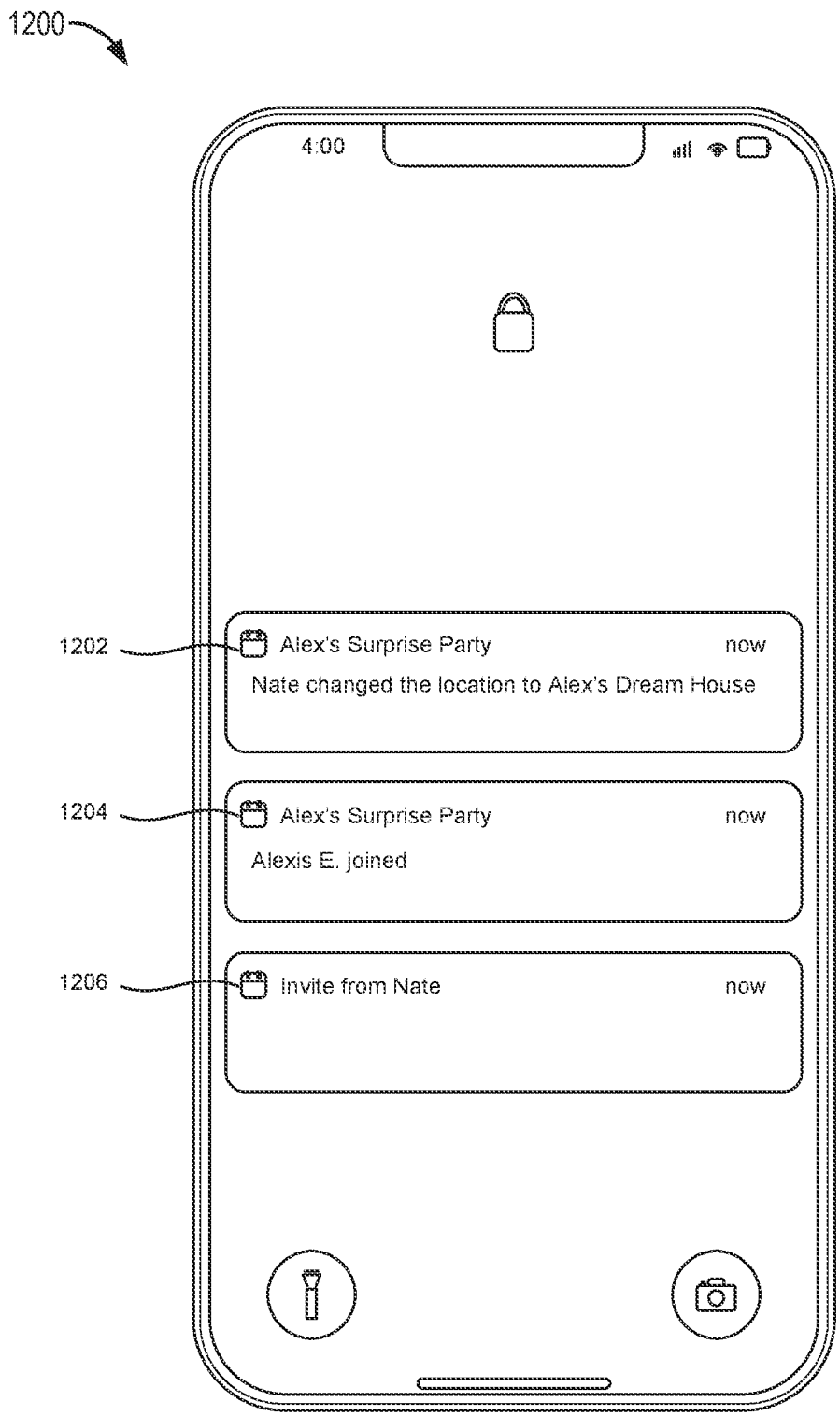

In one example, the computing system generates notifications associated with the event. For example, the computing system generates a notification that the new user joined the event and sends the notification to the computing device corresponding to the user that created the event, to other users who have joined the event, and/or to other users that are invited to the event. The corresponding computing device receives the notification that the new user joined the event and causes display of the notification on a display of the computing device. FIG. 12 illustrates an example display 1200 of a computing device showing three example notifications that have been received by a computing device. The first notification 1202 has information indicating that something in the event has changed (e.g., the location has changed). The second notification 1204 has information indicating that a new user (Alex F.) has joined the event. The third notification 1206 has information indicating that the user has received a new invite.

Figure 13:
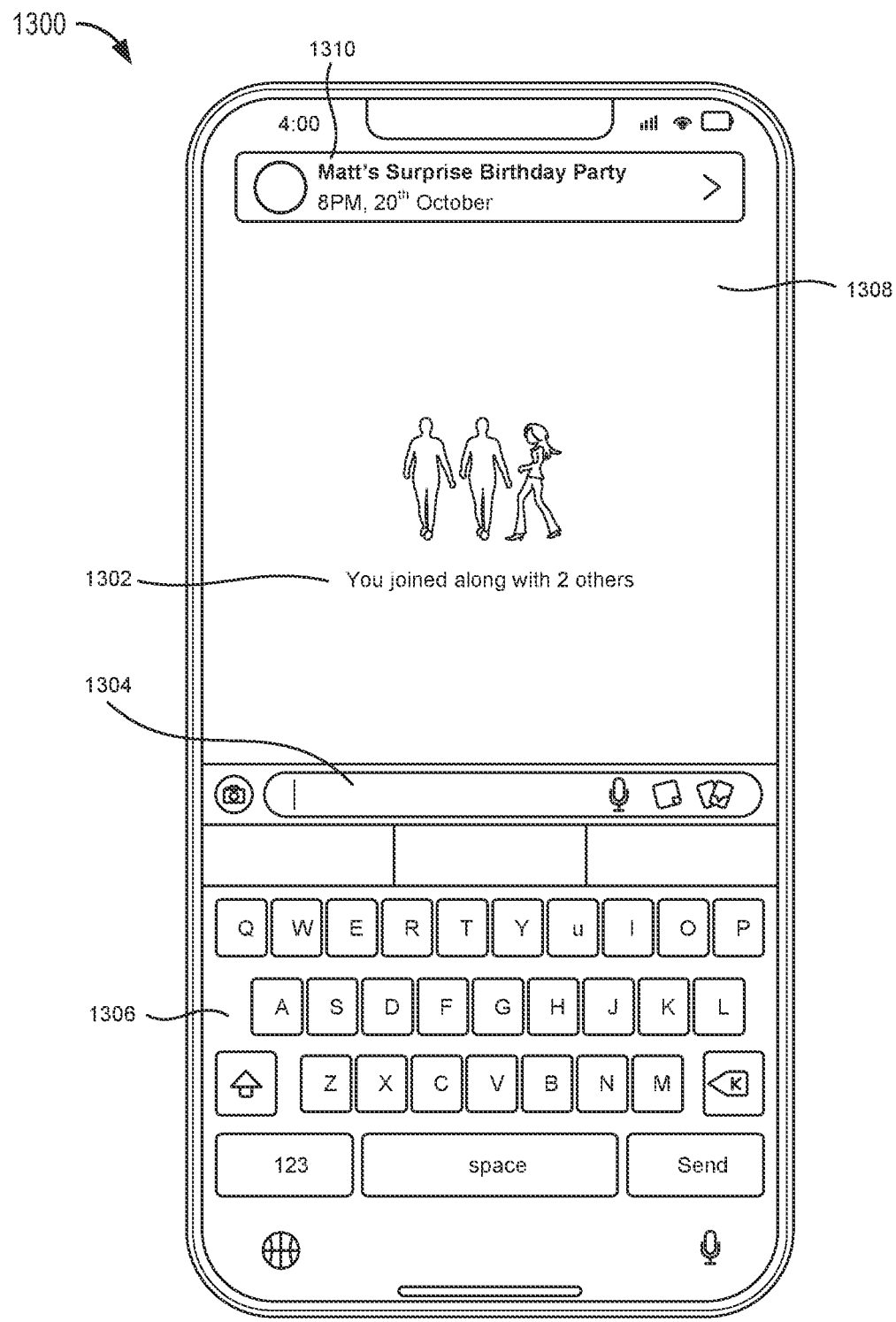
Figure 14:
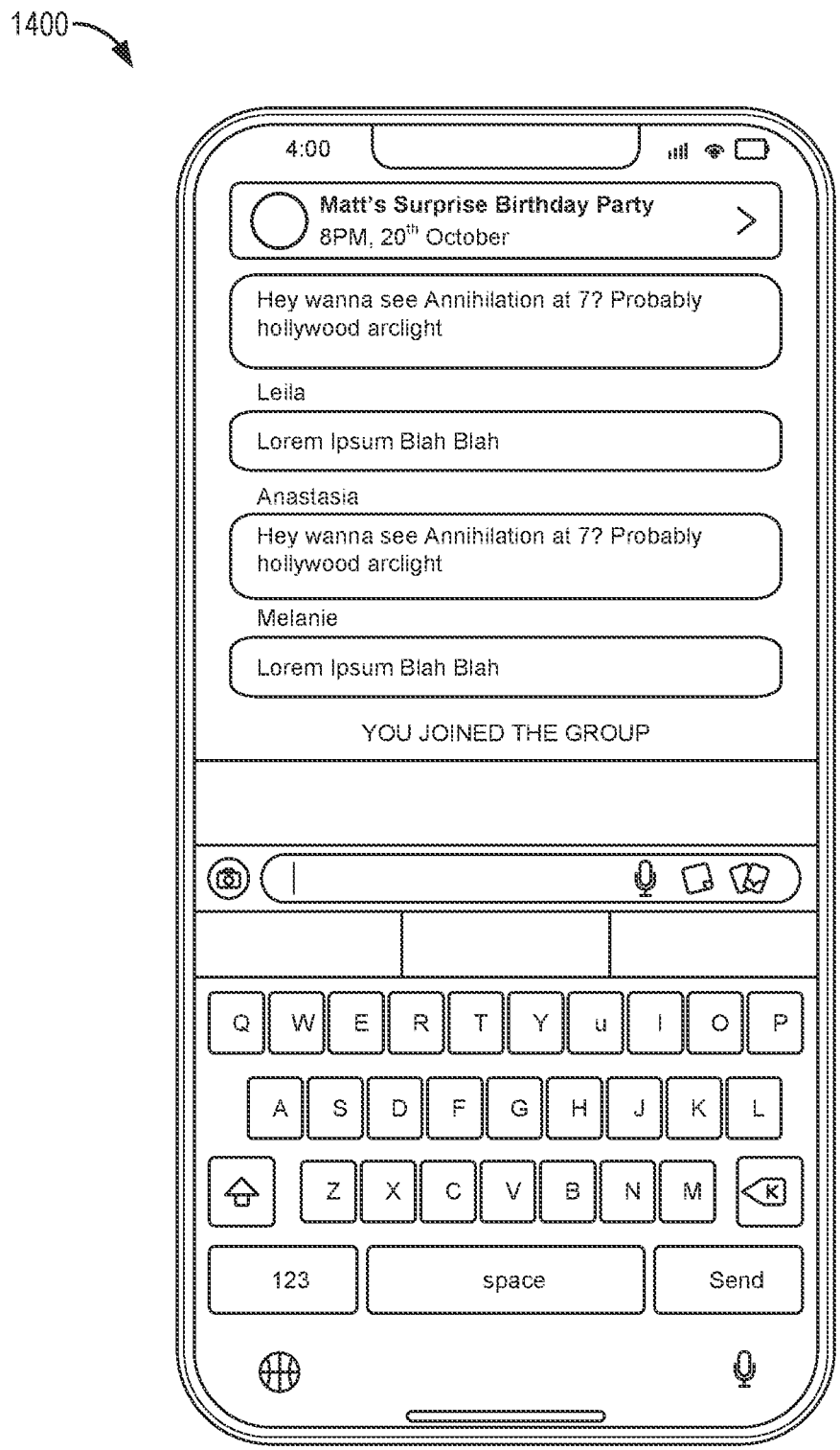

Once the computing system adds the user to the event, the computing system sends a response message to the computing device indicating that the user has successfully joined the event. The computing device can display an indication to the user that they have successfully joined the event. In one example, the computing device displays a message indicating that the user has joined in a chat interface to allow the user to chat with other users that have joined the event. FIG. 13 is an example GUI 1300 that includes a message 1302 indicating that the user has successfully joined the event 1310 and allows the user to send a message to the other users that have joined the event, such as by typing in a message in a dialog box 1304 via the keyboard 1306 or other means. The message the user and other users send will appear in the display section 1308, as shown in the example GUI 1400 of FIG. 14.

In one example embodiment, the computing device causes display of the chat session between users that have joined the event, wherein a user joining an event can only view messages in the chat session that occurred after the user joined the event. Any messages in the chat session before the user joined are visible to other users who have already joined, but not to the new user that has just joined. Any messages in the chat session that occur after the new user has joined, will be visible by the new user. In another example embodiment, when the user joins the event, the user can view all messages that that occurred before joining.

Figure 15:
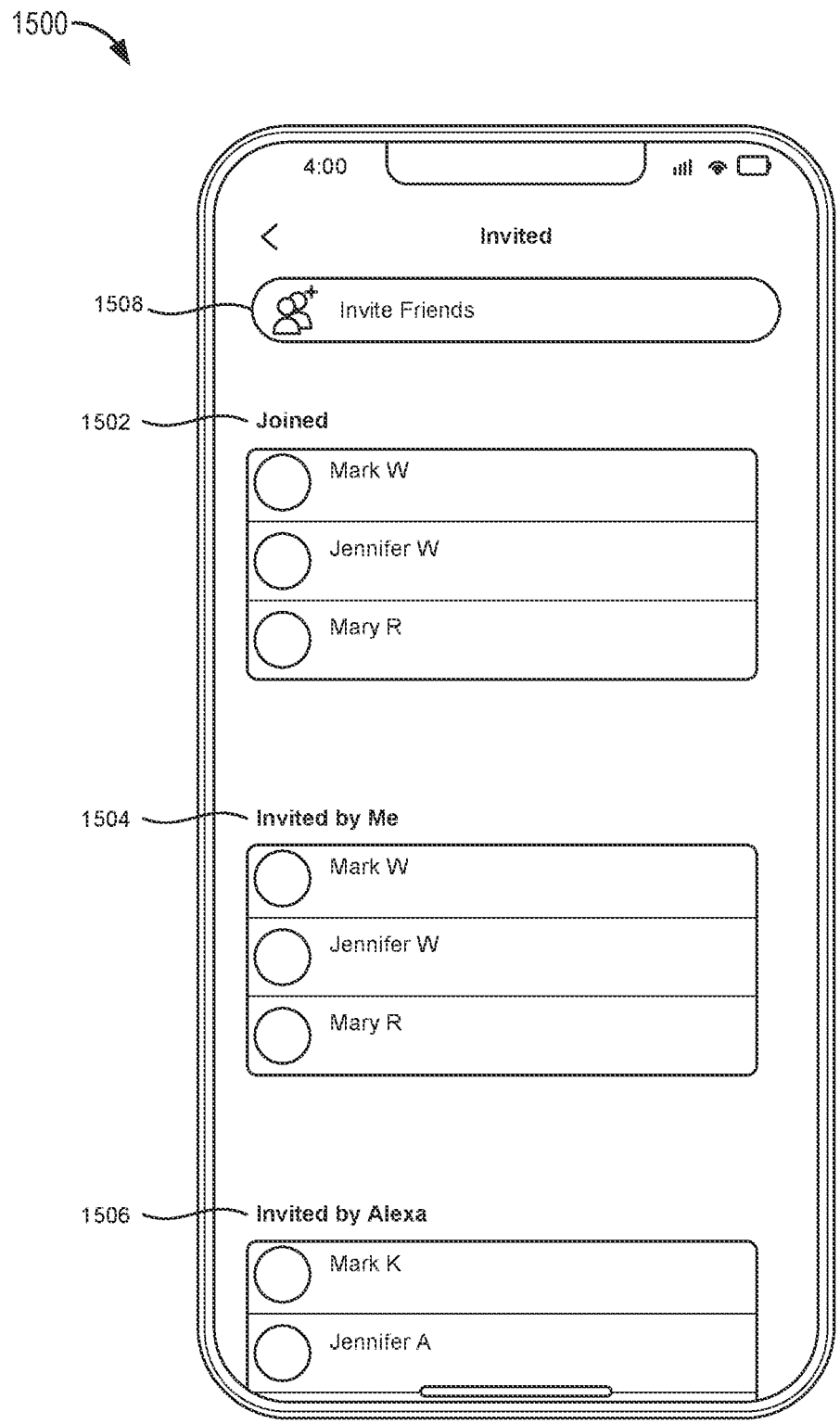
Figure 16:
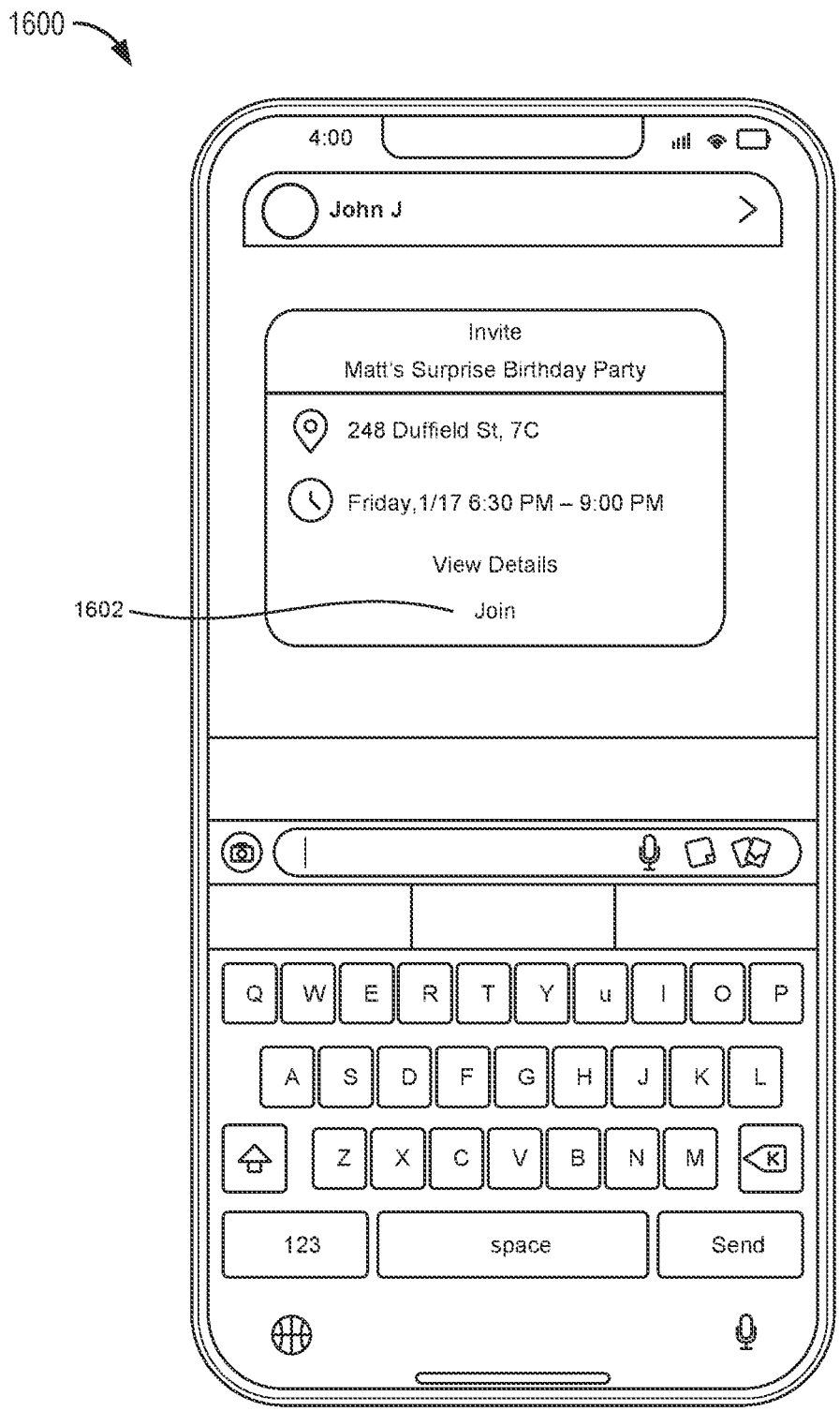

In one example embodiment, the computing device causes display of a GUI showing a list of users that have joined the event, a list of users that were invited but have not joined the event, and/or a list of users invited by a user other than the user that created the event that joined the event. FIG. 15 illustrates an example GUI 1500 that includes a list 1502 of users that have joined the event, a list 1504 of users that were invited by a first user (Me), and a list 1506 of users that were invited by a second user (Alexa). The GUI 1500 also include an option 1508 to invite additional users to the event. For example, if a user chooses to invite additional users, the invite comprising the media content item and custom event invite media overlay will be sent to the additional users. In another example, the invite comprising the custom event invite media overlay can be sent directly to each of the additional users via a chat session, as shown in the example GUI 1600 of FIG. 16. The user receiving the invite can join directly via the chat session (e.g., via join option 1602).

In one example embodiment, any user can invite any other users to the event. In another example embodiment, a user (e.g., a first user) can only invite another user to the event if the first user is a "friend" or a "best friend" of the user who created the event (the creator user). For instance, the first user must be of a certain status in the social network of the creator user in order for the first user to be able to send the invite to other users. The certain status can be set by the creator user or as a default by the computing system.

In one example embodiment, a user can share an invite that someone else created by adding the custom event invite media overlay to a media content item created by the user. For example, a user can take a photo or video and then add the custom invite media overlay and send the invite comprising the media content item and custom event invite media overlay to one or more other users. In another example, a user can share an invite by creating a new custom event invite media overlay that allows users to join the same event group as the original invite (e.g., the new custom event invite media overlay is linked to the original invite/event group).

Figure 17:
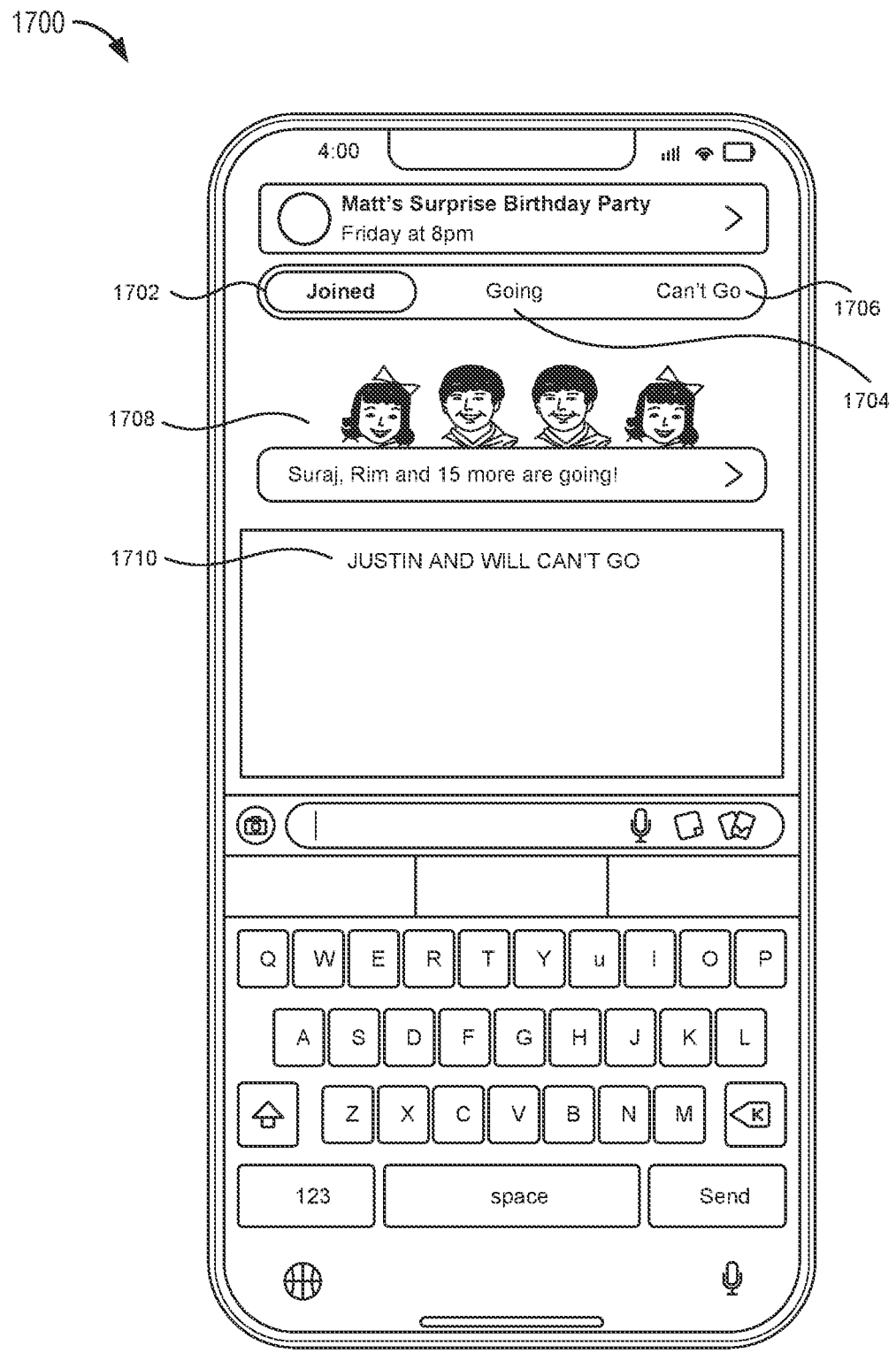

In one example embodiment, users can optionally RSVP when joining the event, or after joining the event. For example, the computing device can cause display of options for indicating whether the user will attend the event. FIG. 17 illustrates an example GUI 1700 including options to RSVP for the event. For example, the options include an option 1702 indicating that the user has joined the event, an option 1704 that can be selected to indicate that the user will attend the event, and an option 1706 indicating that the user will not attend the event. The GUI 1700 also includes messages indicating users that will be attending the event (1708) and users that will not be attending the event (1710). In one example, a user can still be part of the event group as long as the user has joined the event, regardless whether the user has indicated whether he can or cannot attend the event.

Figure 18:
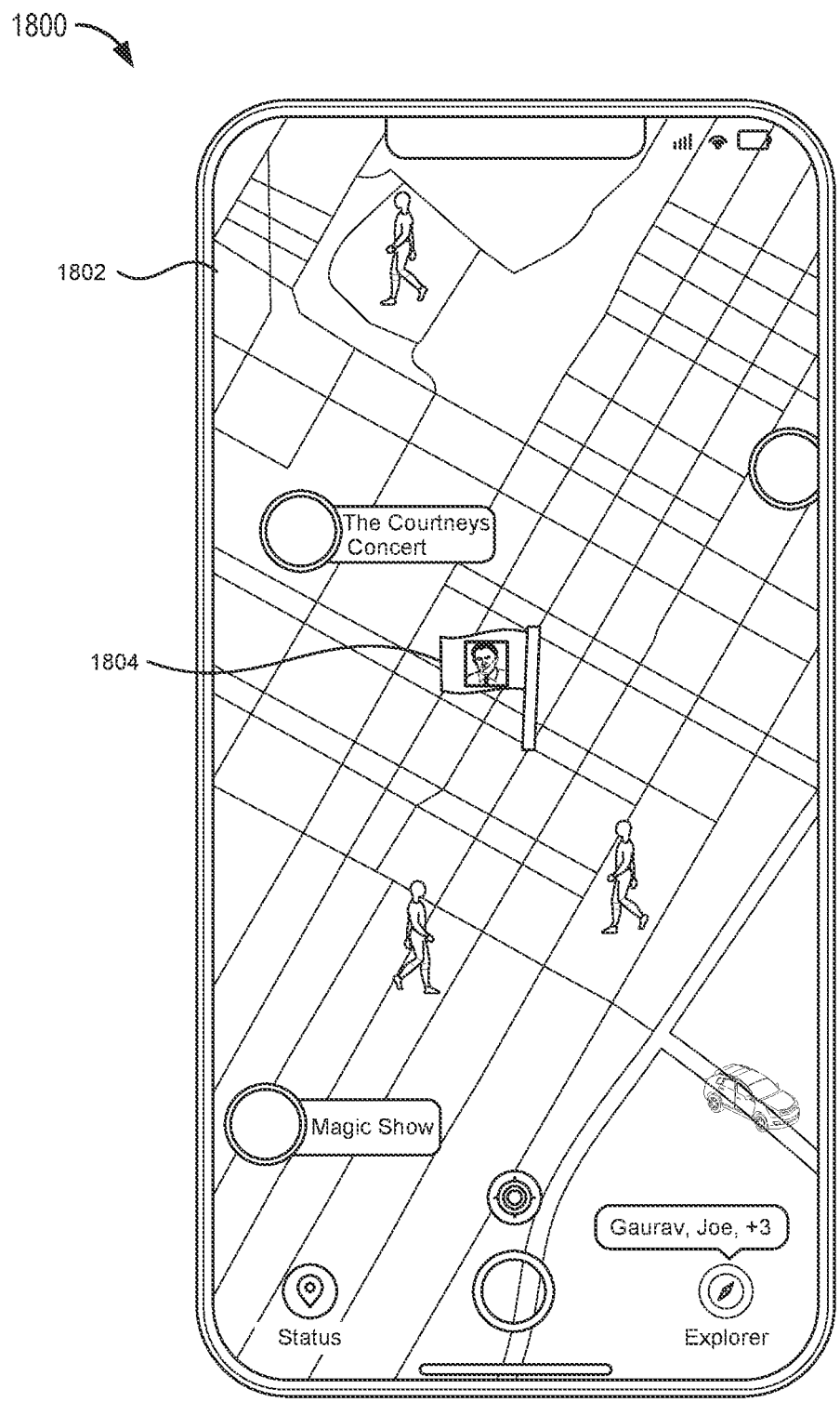

In one example embodiment, the computing device causes an indication of the event to display on a map in a GUI on the computing device. The indication of the event appears on the map at a location corresponding to the event and within a time period corresponding to the time of day of the event. FIG. 18 illustrates an example GUI 1800 displaying a map 1802 with an indication of the event in the form of a flag 1804. The flag 1804 is at a location in the map corresponding to the location of the event. In one example, the indication of the event appears on the map within a specified time window. For example, the flag 1804 may appear on the map a certain number of hours before a start time of the event (e.g., 12 hours before the event starts) and can continue to appear for a certain number of hours after an end time of the event (e.g., 6 hours after the event ends).

In one example embodiment, the visual indication of the event can reflect a number of people that have arrived at the event. For example, the flag or a blimp or balloon representing the event can expand (e.g., get bigger and bigger) the more people get to the event (and retract, e.g., get smaller and smaller as people leave the event).

Figure 19:
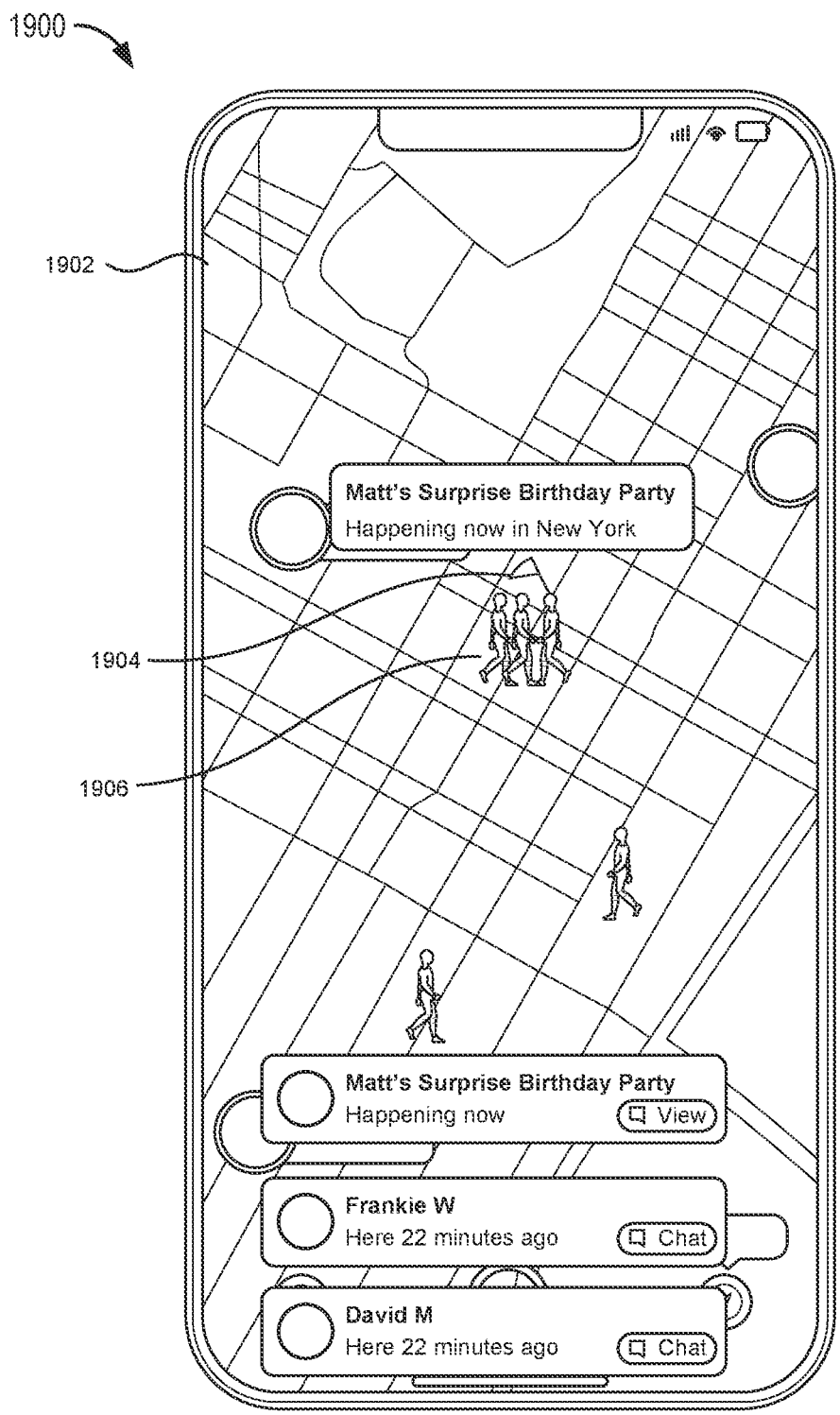

In one example embodiment, the computing device causes display of an avatar (or other indicium) corresponding to each user that is currently attending the event (e.g., at the location of the event). In one example, the avatar is a visual representation of the user (e.g., similar hair color or style, similar style, as the user). FIG. 19 illustrates an example GUI 1900 displaying a map 1902 with an indication of the event 1904 and an avatar 1906 for each user that is currently located at the event. For example, the computing system (e.g., server system 108) detects that a user is in a location within a predefined distance from the location of the event during a time period of the event (e.g., after the event starts, between when the event starts and when the event ends) and sends the information to the computing device to cause the avatar (or other indicia) for the user to be displayed on the map 1902 at the location of the event.

In one example embodiment, a user (e.g., the user that created the event) can cancel the event, but the event group can stay active. For example, when the event is cancelled, the computing device sends a request to cancel the event to a computing system. The computing system receives the request, stores an indication that the event is canceled, sends a notification to each user that joined the event that the event has been canceled, and changes the status and tile of the event to indicate that the event is canceled. The event group, however, can remain active so that the users that joined the event can continue to chat in a chat session.

In one example embodiment, users who are attending the event can capture media content items (e.g., images or video) and post them to the event group. For example, the computing device or computing system can determine that a user who has joined the event is capturing an image or video in a location of the event during the time of the event and automatically post the image or video to the event group in the form of a group story. The group story can be populated by media content items captured by the users that have joined the event when they are attending the event. In one example, the media content items posted to the event group are only viewable by those users that are part of the group.

For instance, a media content item can be captured on a computing device via a camera of the computing device. The computing device (or computing system) determines that the media content item is captured at a location (e.g., via GPS or similar technology of the computing device) and time of day corresponding to the event. The computing device (or computing system) can automatically post the media content item to a group story for the event group, based on determining that the media content item is captured at a location and time of day corresponding to the event.

In one example embodiment, instead of automatically posting media content items captured by users that have joined the event when they are attending the event, the computing device can include the group story in a destination list for sending the media content item. For example, after capturing the media content item, a user can select an option to send the media content item to a destination (e.g., one or more users and/or groups of users). The computing device can cause the event group to appear in the destination list.

Figure 20:
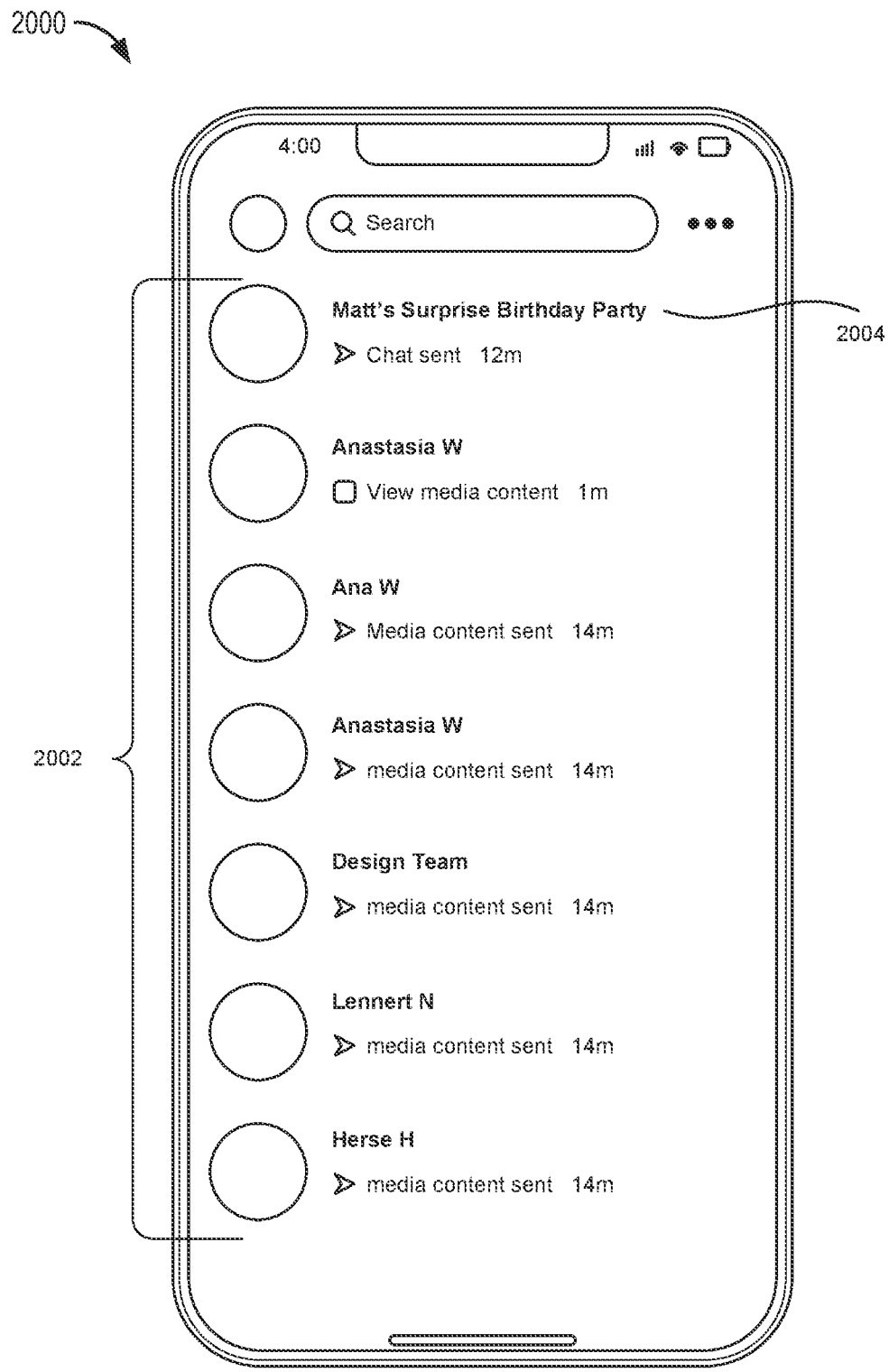

In one example embodiment, the destinations in the destination list are ranked in an order of relevance. In this case, the event group can be ranked higher in the list based on detecting that the user capturing the media content item has captured the media content item while attending the event (e.g., has captured the media content item while in the location of the event during the time of the event). FIG. 20 illustrates an example GUI 2000 displaying a destination list 2002 with the event group 2004 ranked first in the list. The user can select the event group 2004 to post the media content item to the group story for the event. The group story or media content item may be ephemeral (e.g., available for viewing for only a predetermined amount of time) or could be available indefinitely.

For instance, a media content item can be captured on a computing device via a camera of the computing device. The computing device (or computing system) determines that the media content item is captured at a location and time of day corresponding to the event. The computing device (or computing system) can rank options to which to send the media content item in a destination list wherein a media collection (group story) corresponding to the event is ranked higher in the destination list based on determining that the media content item is captured at a location and time of day corresponding to the event. The computing device (or computing system) causes display of the destination list with the ranked options on a display of the computing device.

Figure 21:
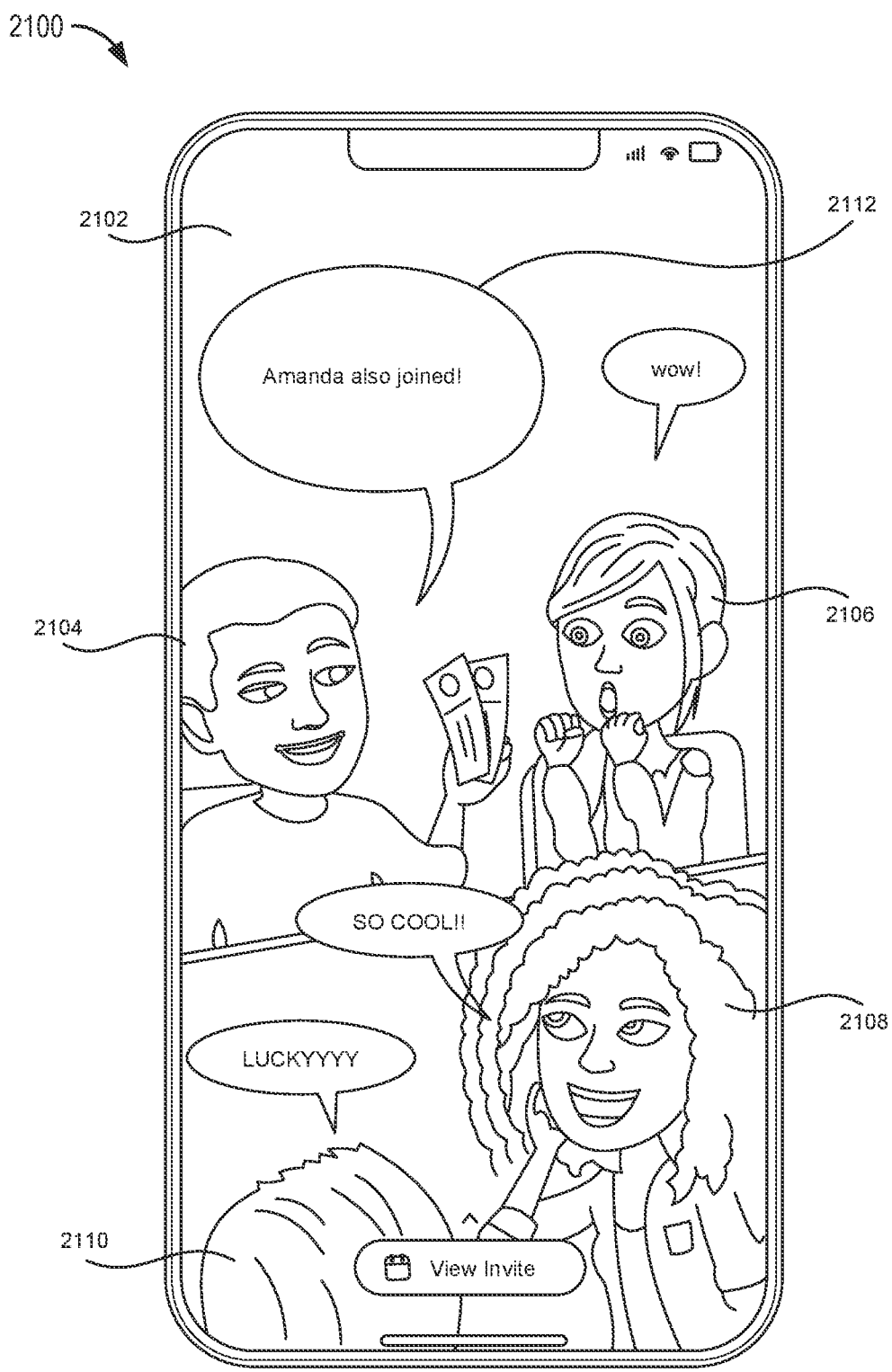

In one example, a graphic can be automatically generated and added to the group story when certain events occur corresponding to the event. For example, a graphic can be generated and added to the group story for the event group to indicate that a new user has joined the event. FIG. 21 illustrates an example graphic 2102 generated to reflect an event occurring for the event. In this example, avatars 2104, 2106, 2108, and 2110 representing some users that have joined are included in the graphic 2102, and a message 2112 that a new user has joined is included in the graphic 2102. The graphic 2102 is added to the media collection (group story for the event group).

In one example, the details of the event are integrated into a calendar on the computing device. The event details can be synced with the event integrated into the calendar to reflect any changes to the event (e.g., location change, date or time change, cancellation).

Figure 22:
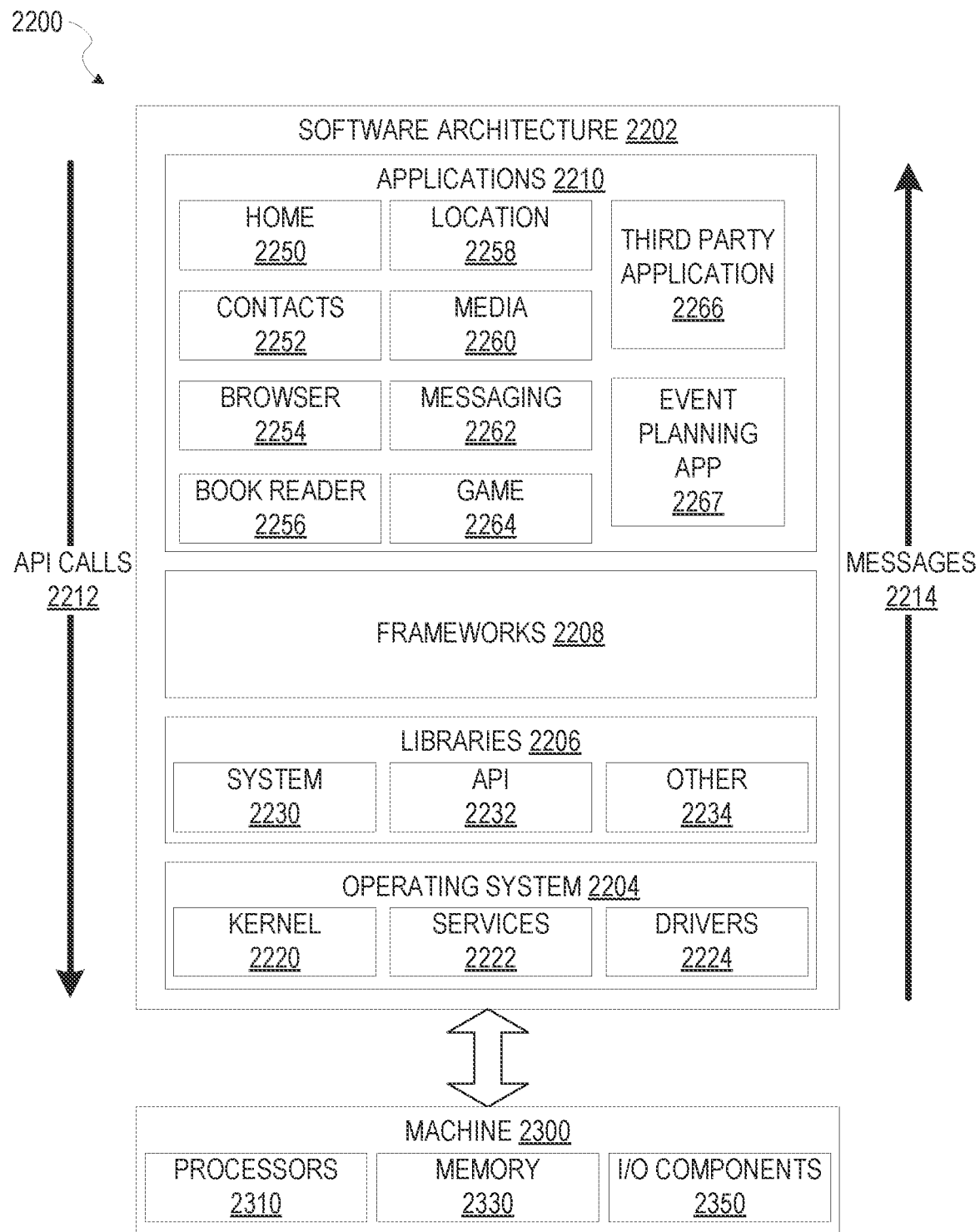
FIG. 22 is a block diagram illustrating an example of a software architecture that may be installed on a machine, according to some example embodiments.

FIG. 22 is a block diagram 2200 illustrating a software architecture 2202, which can be installed on any one or more of the devices described above. For example, in various embodiments, client devices 110 and servers and systems 102, 112, 116, 118, 122, and 124 may be implemented using some or all of the elements of the software architecture 2202. FIG. 22 is merely a non-limiting example of a software architecture, and it will be appreciated that many other architectures can be implemented to facilitate the functionality described herein. In various embodiments, the software architecture 2202 is implemented by hardware such as a machine 2300 of FIG. 23 that includes processors 2310, memory 2330, and input/output I/O components 2350. In this example, the software architecture 2202 can be conceptualized as a stack of layers where each layer may provide a particular functionality. For example, the software architecture 2202 includes layers such as an operating system 2204, libraries 2206, frameworks 2208, and applications 2210. Operationally, the applications 2210 invoke API calls 2212 through the software stack and receive messages 2214 in response to the API calls 2212, consistent with some embodiments.

In various implementations, the operating system 2204 manages hardware resources and provides common services. The operating system 2204 includes, for example, a kernel 2220, services 2222, and drivers 2224. The kernel 2220 acts as an abstraction layer between the hardware and the other software layers, consistent with some embodiments. For example, the kernel 2220 provides memory management, processor management (e.g., scheduling), component management, networking, and security settings, among other functionality. The services 2222 can provide other common services for the other software layers. The drivers 2224 are responsible for controlling or interfacing with the underlying hardware, according to some embodiments. For instance, the drivers 2224 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 2206 provide a low-level common infrastructure utilized by the applications 2210. The libraries 2206 can include system libraries 2230 (e.g., C standard library) that can provide functions such as memory allocation functions, string manipulation functions, mathematic functions, and the like. In addition, the libraries 2206 can include API libraries 2232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render two-dimensional (2D) and three-dimensional (3D) graphic content on a display), database libraries (e.g., SQLite to provide various relational database functions), web libraries (e.g., WebKit to provide web browsing functionality), and the like. The libraries 2206 can also include a wide variety of other libraries 2234 to provide many other APIs to the applications 2210.

The frameworks 2208 provide a high-level common infrastructure that can be utilized by the applications 2210, according to some embodiments. For example, the frameworks 2208 provide various graphic user interface (GUI) functions, high-level resource management, high-level location services, and so forth. The frameworks 2208 can provide a broad spectrum of other APIs that can be utilized by the applications 2210, some of which may be specific to a particular operating system 2204 or platform.

In an example embodiment, the applications 2210 include a home application 2250, a contacts application 2252, a browser application 2254, a book reader application 2256, a location application 2258, a media application 2260, a messaging application 2262, a game application 2264, and a broad assortment of other applications such as a third-party application 2266. According to some embodiments, the applications 2210 are programs that execute functions defined in the programs. Various programming languages can be employed to create one or more of the applications 2210, structured in a variety of manners, such as object-oriented programming languages (e.g., Objective-C, Java, or C++) or procedural programming languages (e.g., C or assembly language). In a specific example, the third-party application 2266 (e.g., an application developed using the ANDROID™ or IOS™ software development kit (SDK) by an entity other than the vendor of the particular platform) may be mobile software running on a mobile operating system such as TOS™, ANDROID™ WINDOWS® Phone, or another mobile operating system. In this example, the third-party application 2266 can invoke the API calls 2212 provided by the operating system 2204 to facilitate functionality described herein.

Some embodiments may particularly include an event planning application 2267. In certain embodiments, this may be a standalone application that operates to manage communications with a server system, such as third-party servers or the server system 108. In other embodiments, this functionality may be integrated with another application (e.g., the messaging application 2262). The event planning application 2267 may request and display various data related to messaging, media content, media collections, media overlays, interactive messages, chat messages, and so forth, and may provide the capability for a user to input data related to the system via a touch interface, via a keyboard, or using a camera device of the machine 2300, communication with a server system via the I/O components 2350, and receipt and storage of object data in the memory 2330. Presentation of information and user inputs associated with the information may be managed by the event planning application 2267 using different frameworks 2208, library 2206 elements, or operating system 2204 elements operating on the machine 2300.

Figure 23:
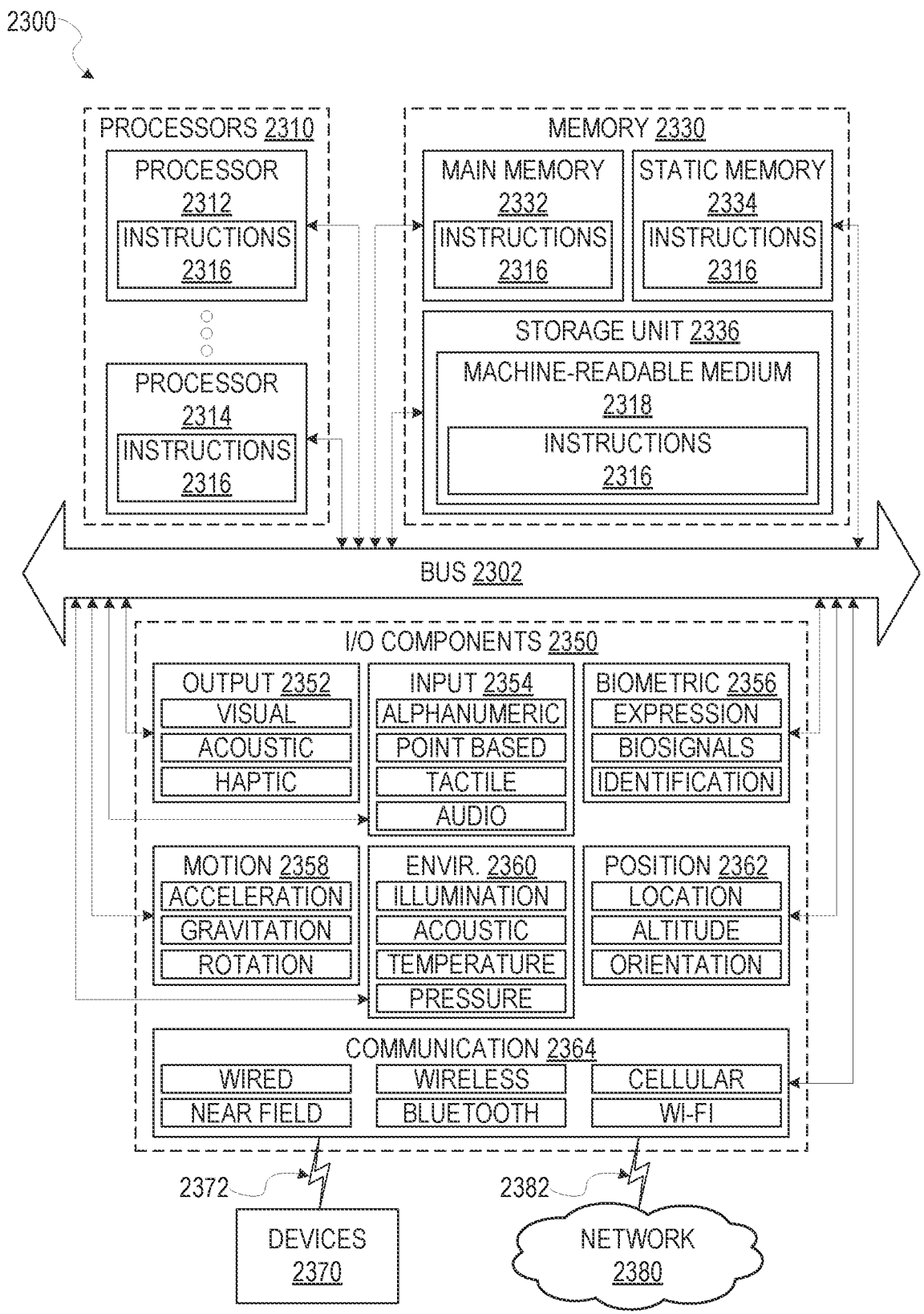
FIG. 23 illustrates a diagrammatic representation of a machine, in the form of a computer system, within which a set of instructions may be executed for causing the machine to perform any one or more of the methodologies discussed herein, according to an example embodiment.

FIG. 23 is a block diagram illustrating components of a machine 2300, according to some embodiments, able to read instructions from a machine-readable medium (e.g., a machine-readable storage medium) and perform any one or more of the methodologies discussed herein. Specifically, FIG. 23 shows a diagrammatic representation of the machine 2300 in the example form of a computer system, within which instructions 2316 (e.g., software, a program, an application, an applet, an app, or other executable code) for causing the machine 2300 to perform any one or more of the methodologies discussed herein can be executed. In alternative embodiments, the machine 2300 operates as a standalone device or can be coupled (e.g., networked) to other machines. In a networked deployment, the machine 2300 may operate in the capacity of a server system 102, 112, 116, 118, 122, 124, and the like, or a client device 110 in a server-client network environment, or as a peer machine in a peer-to-peer (or distributed) network environment. The machine 2300 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2316, sequentially or otherwise, that specify actions to be taken by the machine 2300. Further, while only a single machine 2300 is illustrated, the term "machine" shall also be taken to include a collection of machines 2300 that individually or jointly execute the instructions 2316 to perform any one or more of the methodologies discussed herein.

In various embodiments, the machine 2300 comprises processors 2310, memory 2330, and I/O components 2350, which can be configured to communicate with each other via a bus 2302. In an example embodiment, the processors 2310 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 2312 and a processor 2314 that may execute the instructions 2316. The term "processor" is intended to include multi-core processors 2310 that may comprise two or more independent processors 2312, 2314 (also referred to as "cores") that can execute instructions 2316 contemporaneously. Although FIG. 23 shows multiple processors 2310, the machine 2300 may include a single processor 2310 with a single core, a single processor 2310 with multiple cores (e.g., a multi-core processor 2310), multiple processors 2312, 2314 with a single core, multiple processors 2312, 2314 with multiple cores, or any combination thereof.

The memory 2330 comprises a main memory 2332, a static memory 2334, and a storage unit 2336 accessible to the processors 2310 via the bus 2302, according to some embodiments. The storage unit 2336 can include a machine-readable medium 2318 on which are stored the instructions 2316 embodying any one or more of the methodologies or functions described herein. The instructions 2316 can also reside, completely or at least partially, within the main memory 2332, within the static memory 2334, within at least one of the processors 2310 (e.g., within the processor's cache memory), or any suitable combination thereof, during execution thereof by the machine 2300. Accordingly, in various embodiments, the main memory 2332, the static memory 2334, and the processors 2310 are considered machine-readable media 2318.

As used herein, the term "memory" refers to a machine-readable medium 2318 able to store data temporarily or permanently and may be taken to include, but not be limited to, random-access memory (RAM), read-only memory (ROM), buffer memory, flash memory, and cache memory. While the machine-readable medium 2318 is shown, in an example embodiment, to be a single medium, the term "machine-readable medium" should be taken to include a single medium or multiple media (e.g., a centralized or distributed database, or associated caches and servers) able to store the instructions 2316. The term "machine-readable medium" shall also be taken to include any medium, or combination of multiple media, that is capable of storing instructions (e.g., instructions 2316) for execution by a machine (e.g., machine 2300), such that the instructions 2316, when executed by one or more processors of the machine 2300 (e.g., processors 2310), cause the machine 2300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 2350 include a wide variety of components to receive input, provide output, produce output, transmit information, exchange information, capture measurements, and so on. In general, it will be appreciated that the I/O components 2350 can include many other components that are not shown in FIG. 23. The I/O components 2350 are grouped according to functionality merely for simplifying the following discussion, and the grouping is in no way limiting. In various example embodiments, the I/O components 2350 include output components 2352 and input components 2354. The output components 2352 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 2354 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 2350 include biometric components 2356, motion components 2358, environmental components 2360, or position components 2362, among a wide array of other components. For example, the biometric components 2356 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2358 include acceleration sensor components (e.g., accelerometer), gravitation sensor components, rotation sensor components (e.g., gyroscope), and so forth. The environmental components 2360 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 2362 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 2350 may include communication components 2364 operable to couple the machine 2300 to a network 2380 or devices 2370 via a coupling 2382 and a coupling 2372, respectively. For example, the communication components 2364 include a network interface component or another suitable device to interface with the network 2380. In further examples, communication components 2364 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 2370 may be another machine 2300 or any of a wide variety of peripheral devices (e.g., a peripheral device coupled via a Universal Serial Bus (USB)).

Moreover, in some embodiments, the communication components 2364 detect identifiers or include components operable to detect identifiers. For example, the communication components 2364 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 2364, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 2380 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 2380 or a portion of the network 2380 may include a wireless or cellular network, and the coupling 2382 may be a Code Division Multiple Access (CDMA) connection, a Global System for Mobile communications (GSM) connection, or another type of cellular or wireless coupling. In this example, the coupling 2382 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 2316 are transmitted or received over the network 2380 using a transmission medium via a network interface device (e.g., a network interface component included in the communication components 2364) and utilizing any one of a number of well-known transfer protocols (e.g., Hypertext Transfer Protocol (HTTP)). Similarly, in other example embodiments, the instructions 2316 are transmitted or received using a transmission medium via the coupling 2372 (e.g., a peer-to-peer coupling) to the devices 2370. The term "transmission medium" shall be taken to include any intangible medium that is capable of storing, encoding, or carrying the instructions 2316 for execution by the machine 2300, and includes digital or analog communications signals or other intangible media to facilitate communication of such software.

Furthermore, the machine-readable medium 2318 is non-transitory (in other words, not having any transitory signals) in that it does not embody a propagating signal. However, labeling the machine-readable medium 2318 "non-transitory" should not be construed to mean that the medium is incapable of movement; the machine-readable medium 2318 should be considered as being transportable from one physical location to another. Additionally, since the machine-readable medium 2318 is tangible, the machine-readable medium 2318 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   causing display, on a user interface of a first computing device, a menu overlaid on a media content item, the menu comprising an interface element to add an event invite media overlay to the media content item;
   receiving, by the first computing device, a selection of the interface element to add the event invite media overlay to the media content item;
   adding to the event invite media overlay, by the first computing device, content corresponding to an invitation to attend an event, to generate a custom event invite media overlay;
   automatically resizing the custom invite media overlay from an original size to a resized custom event invite media overlay based on the content added to the event media overlay;
   causing display of the resized custom event invite media overlay overlaid on the media content item; and
   sending, to a second computing device, the invitation to attend the event comprising the resized custom event invite media overlay overlaid on the media content item.

2. The method of claim 1, wherein the media content item comprises an image or video.

3. The method of claim 1, wherein the event invite media overlay is in the form of a sticker.

4. The method of claim 1, wherein content corresponding to the event comprises at least one of a title, a location, a date, or a time of day.

5. The method of claim 1, further comprising:
   receiving a notification indicating that a user associated with the second computing device joined the event after receiving the invite.

6. The method of claim 1, wherein the first computing device is associated with a first user and the method further comprises:
   displaying a list of users that have joined the event, a list of users that were invited but have not joined the event, and a list of users invited by a second user that has joined the event.

7. The method of claim 1, further comprising:
   displaying an indication of the event on a map in the user interface on the first computing device, the indication of the event appearing on the map at a location corresponding to the event and within a specified time period corresponding to the time of day of the event.

8. The method of claim 7, further comprising:
   displaying an avatar corresponding to each user that is currently attending the event, with the indication of the event on the map.

9. The method of claim 1, further comprising:
   displaying a chat session between users that have joined the event, wherein a user joining an event can only view messages in the chat session that occurred after the user joined the event.

10. The method of claim 1, further comprising:
    capturing a second media content item via a camera device of the computing device;
    determining that the second media content item is captured at a location and time of day corresponding to the event;
    ranking options to which to send the second media content item in a destination list wherein a media collection corresponding to the event is ranked higher in the destination list based on determining that the second media content item is captured at the location and time of day corresponding to the event; and
    displaying the destination list with the ranked options.

11. The method of claim 1, further comprising:
    receiving notification that the at least one user sent the invite to the event comprising the custom event invite media overlay to a third computing device associated with a third user; and
    displaying the notification on a display of the first computing device.

12. The method of claim 1, further comprising:
    generating a token comprising a unique identifier for the invite; and sending the token to a server system wherein the token is correlated with the content corresponding to the event.

13. The method of claim 1, further comprising:
displaying a message in a chat session between users that have joined the event, the message indicating that a new user has joined the event and adding the new user to the chat session.

14. The method of claim 1, wherein a media collection is associated with the event and further comprising:
in response to determining that a new user has joined the event, automatically generating a graphic comprising an avatar of the new user and a messaging indicating that the new user has joined the event; and
adding the generated graphic to the media collection.

15. A computing device comprising:
a memory that stores instructions; and
one or more processors configured by the instructions to perform operations comprising:
causing display, on a user interface of the computing device, a menu overlaid on a media content item, the menu comprising an interface element to add an event invite media overlay to the media content item;
receiving a selection of the interface element to add the event invite media overlay to the media content item;
adding to the event invite media overlay, content corresponding to an invitation to attend an event, to generate a custom event invite media overlay;
automatically resizing the custom invite media overlay from an original size to a resized custom event invite media overlay based on the content added to the event media overlay;
causing display of the resized custom event invite media overlay overlaid on the media content item; and
sending, to a second computing device, the invitation to attend the event comprising the resized custom event invite media overlay overlaid on the media content item.

16. The computing device of claim 15, wherein the computing device is associated with a first user and the operations further comprise:
displaying a list of users that have joined the event, a list of users that were invited but have not joined the event, and a list of users invited by a second user that has joined the event.

17. The computing device of claim 15, the operations further comprising:
displaying an indication of the event on a map in the user interface on the computing device, the indication of the event appearing on the map at a location corresponding to the event and within a specified time period corresponding to the time of day of the event; and
displaying an avatar corresponding to each user that is currently attending the event, with the indication of the event on the map.

18. The computing device of claim 15, the operations further comprising:
displaying a chat session between users that have joined the event, wherein a user joining an event can only view messages in the chat session that occurred after the user joined the event.

19. The computing device of claim 15, the operations further comprising:
capturing a second media content item via a camera device of the computing device;
determining that the second media content item is captured at a location and time of day corresponding to the event;
ranking options to which to send the second media content item in a destination list wherein a media collection corresponding to the event is ranked higher in the destination list based on determining that the second media content item is captured at the location and time of day corresponding to the event; and
displaying the destination list with the ranked options.

20. A non-transitory computer-readable medium comprising instructions stored thereon that are executable by at least one processor to cause a computing device to perform operations comprising:
causing display, on a user interface of the computing device, a menu overlaid on a media content item, the menu comprising an interface element to add an event invite media overlay to the media content item;
receiving a selection of the interface element to add the event invite media overlay to the media content item;
adding to the event invite media overlay, content corresponding to an invitation to attend an event, to generate a custom event invite media overlay;
automatically resizing the custom invite media overlay from an original size to a resized custom event invite media overlay based on the content added to the event media overlay;
causing display of the resized custom event invite media overlay overlaid on the media content item; and
sending, to a second computing device, the invitation to attend the event comprising the resized custom event invite media overlay overlaid on the media content item.

* * * * *